Aug. 21, 1956 C. T. BANKS ET AL 2,759,441
METHOD AND APPARATUS FOR THE MANUFACTURE OF SANITARY
NAPKINS WITH ATTACHMENT LOOPS
Filed April 14, 1952 25 Sheets-Sheet 21

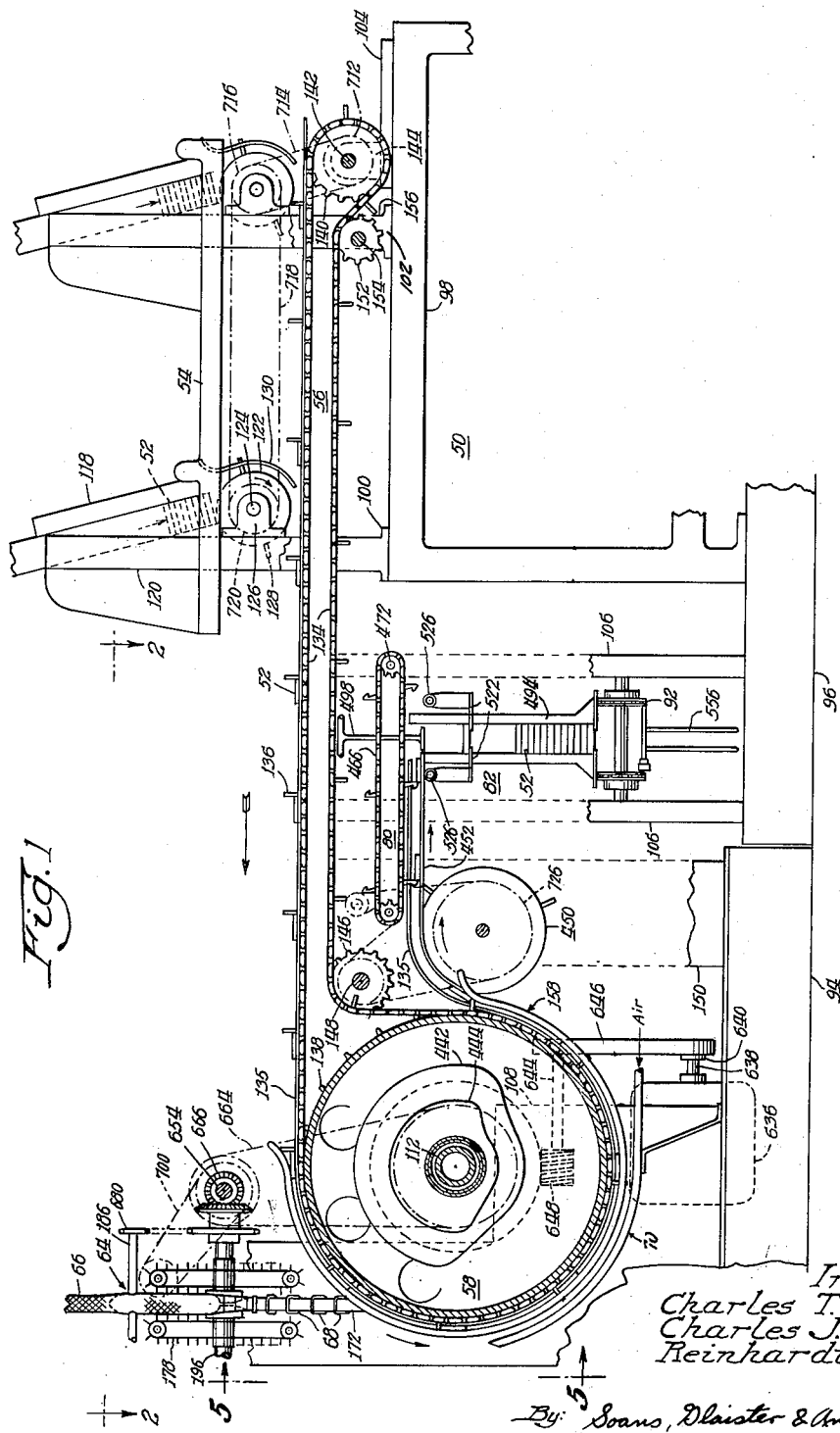

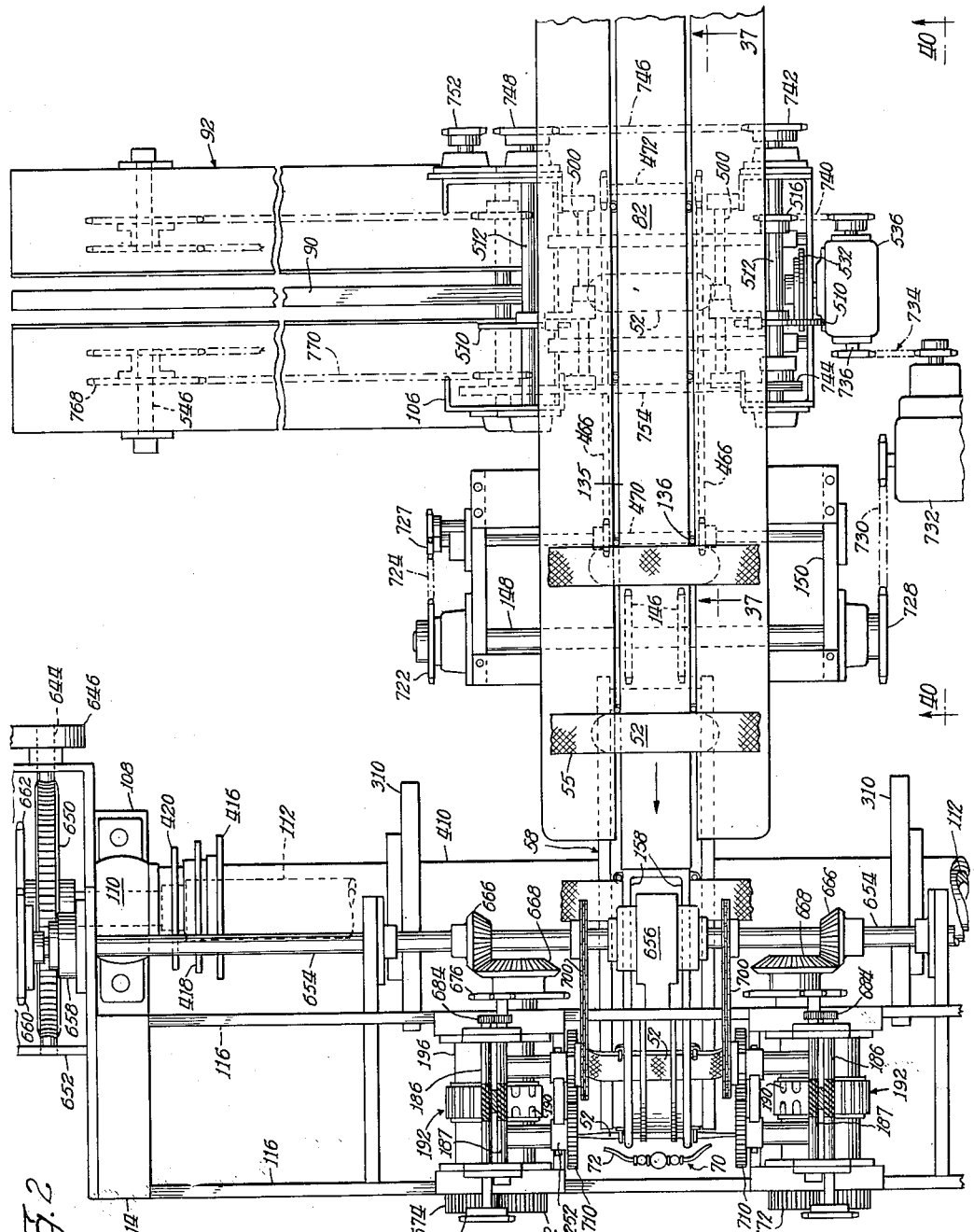

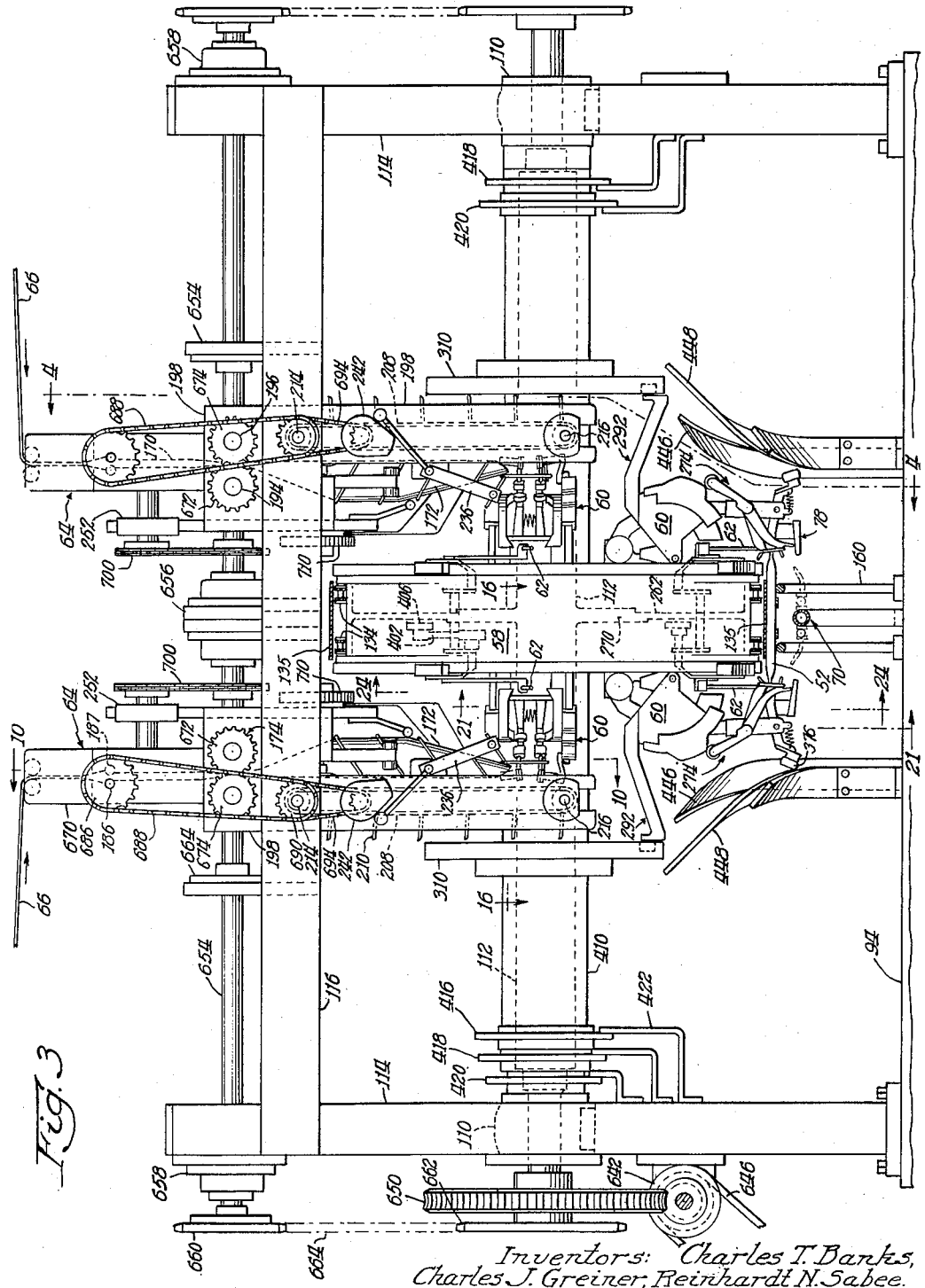

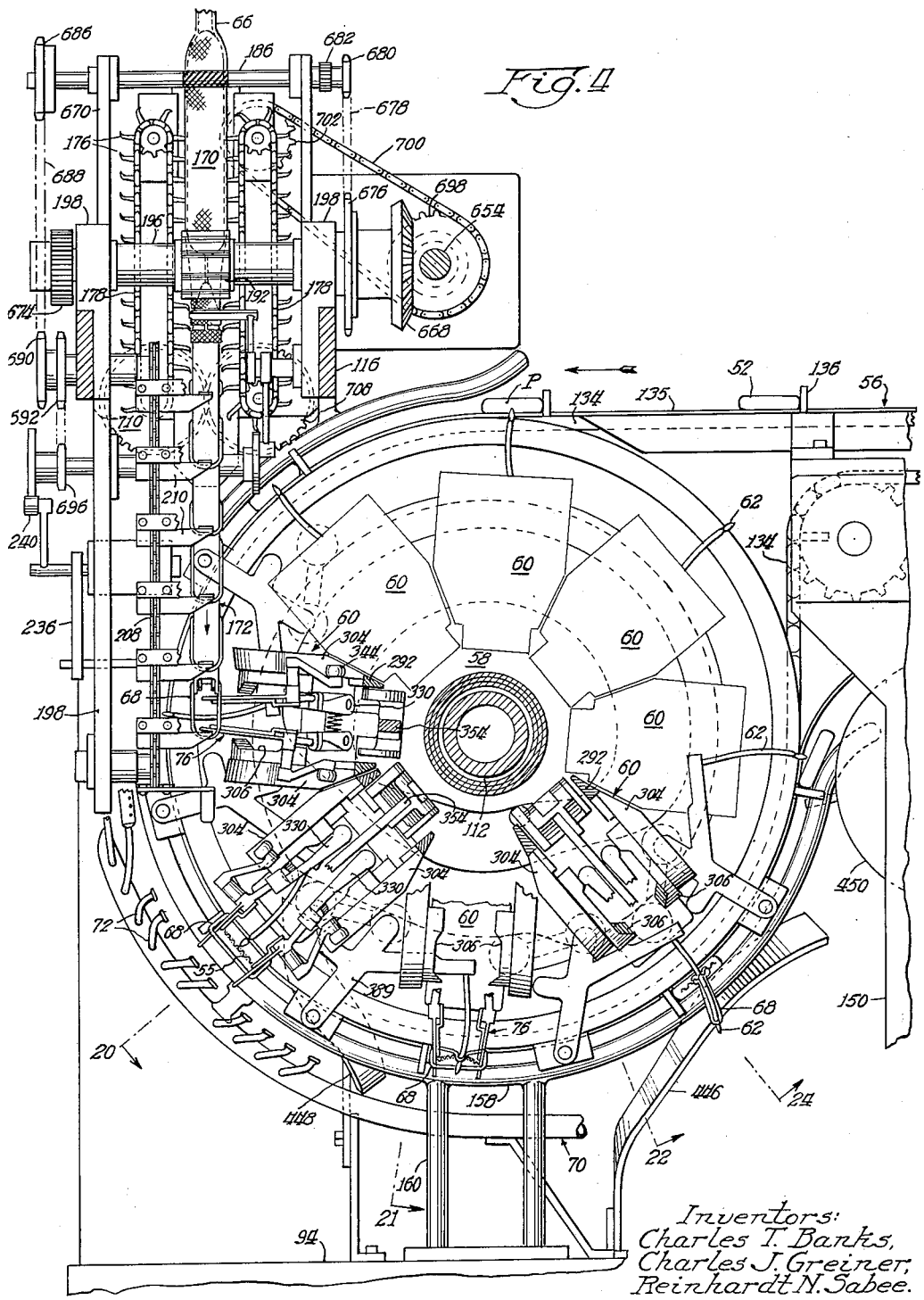

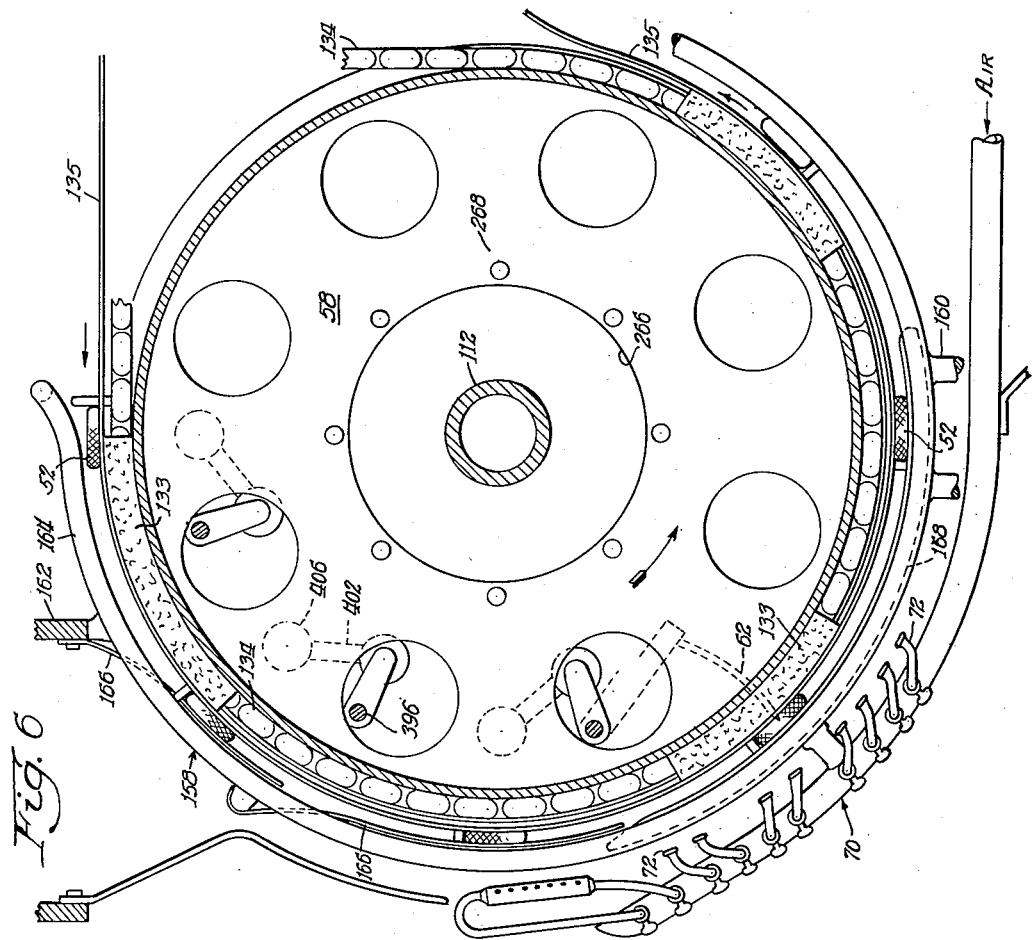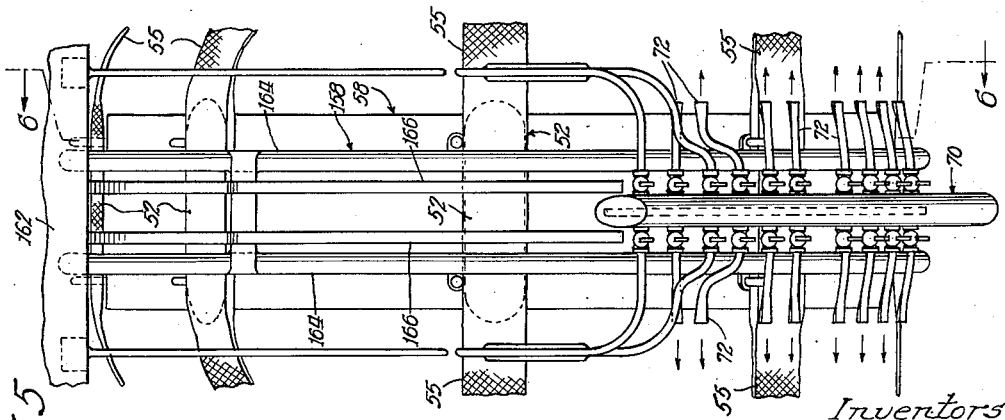

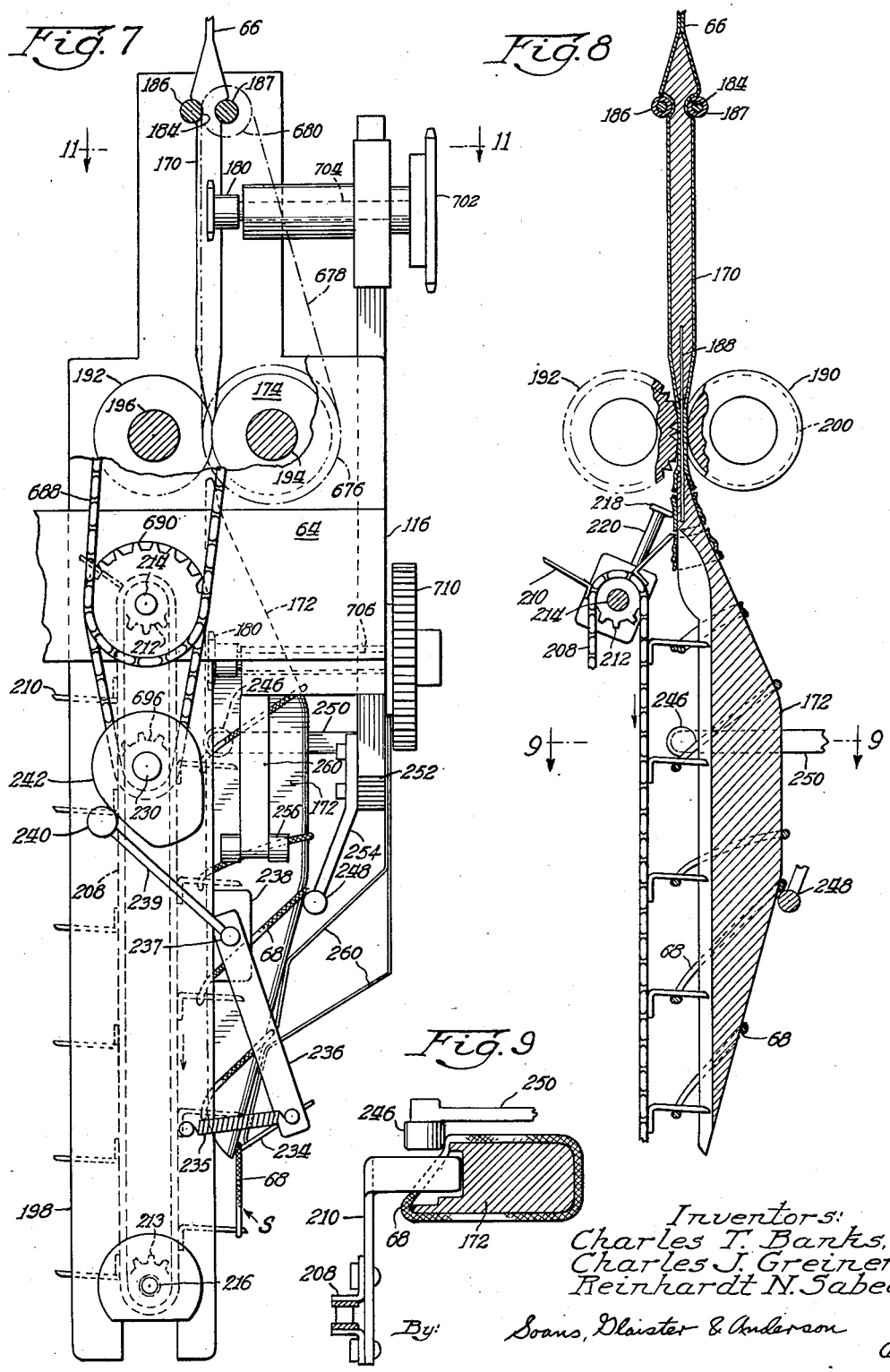

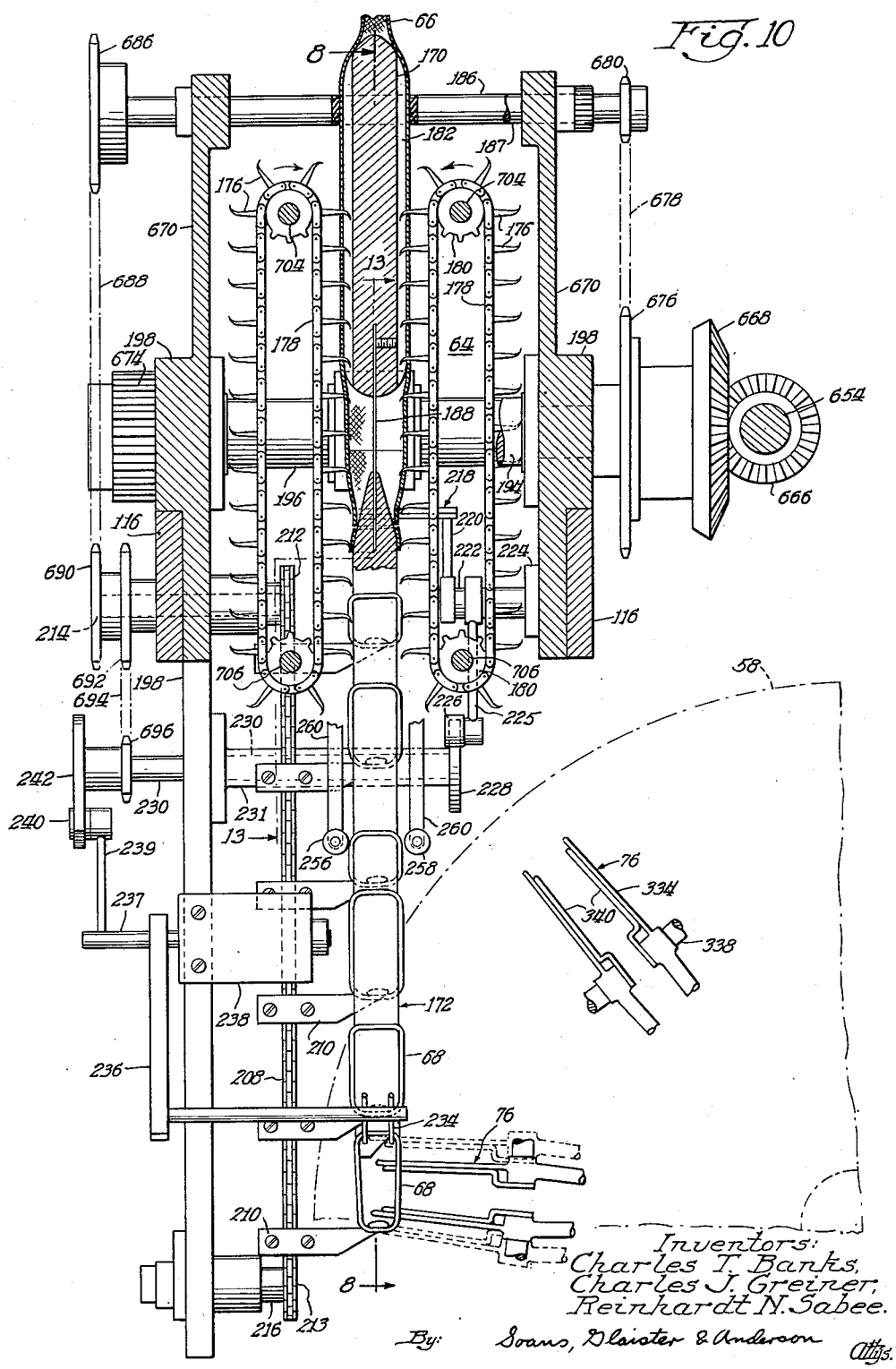

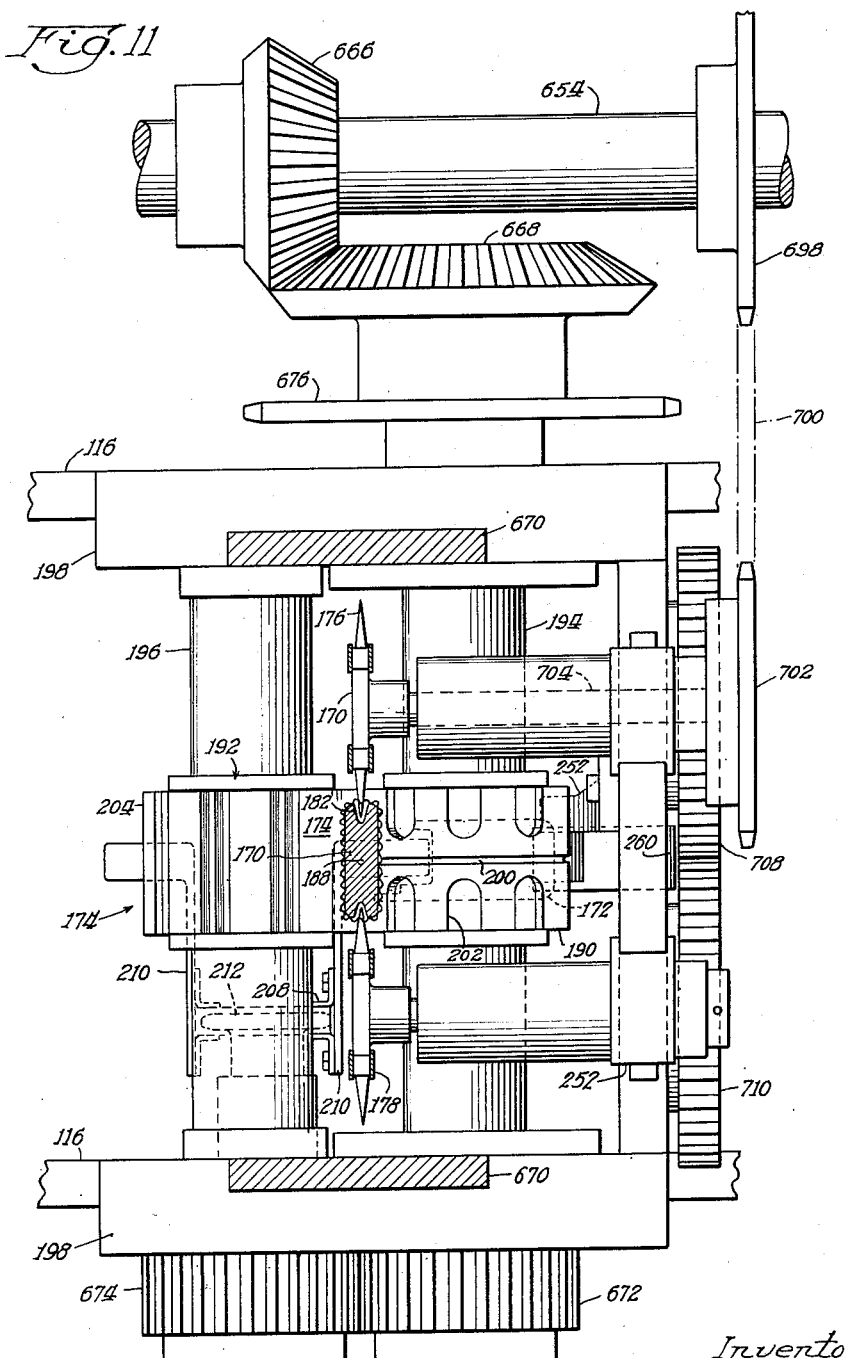

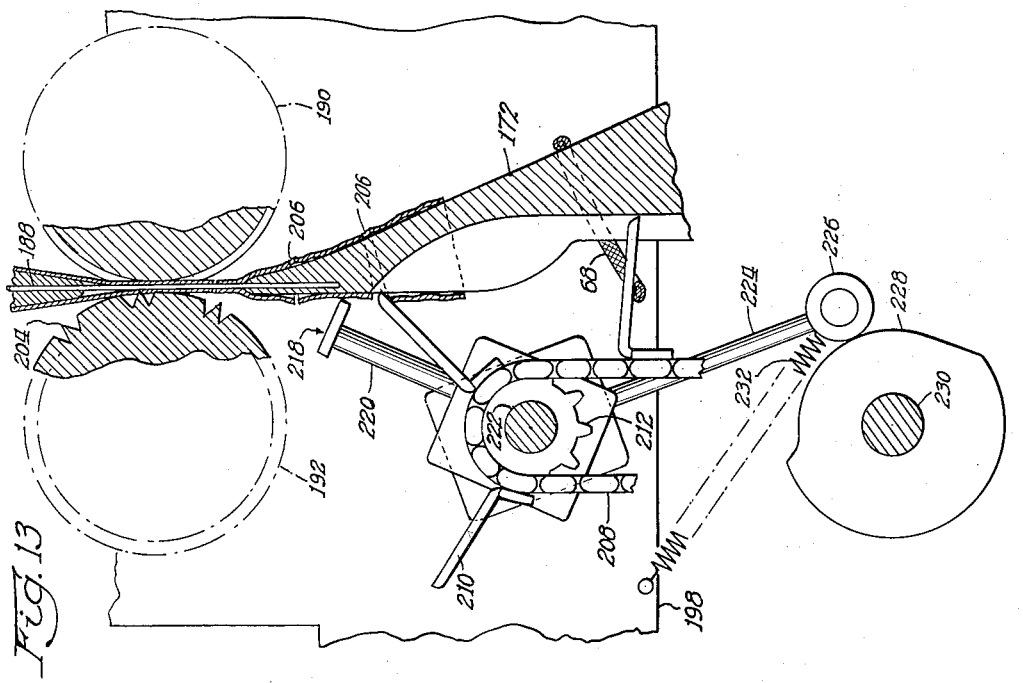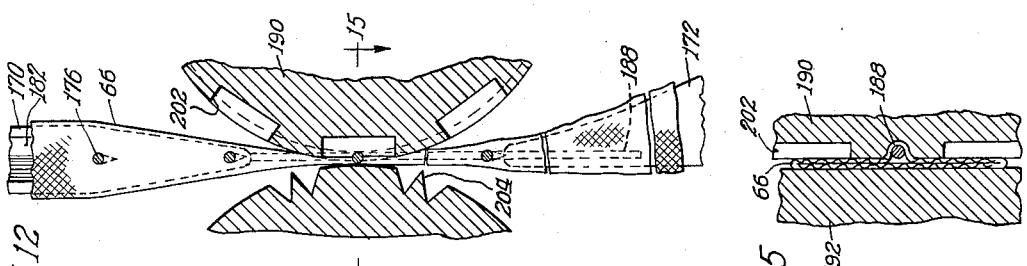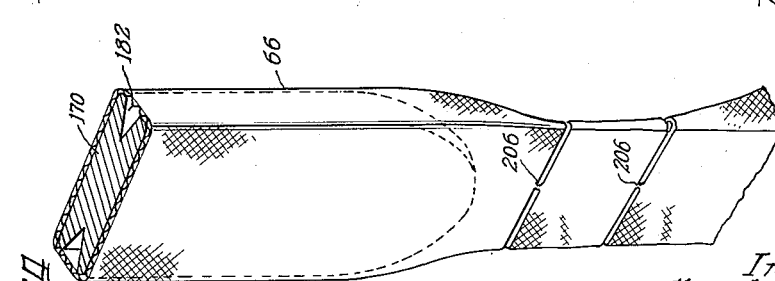

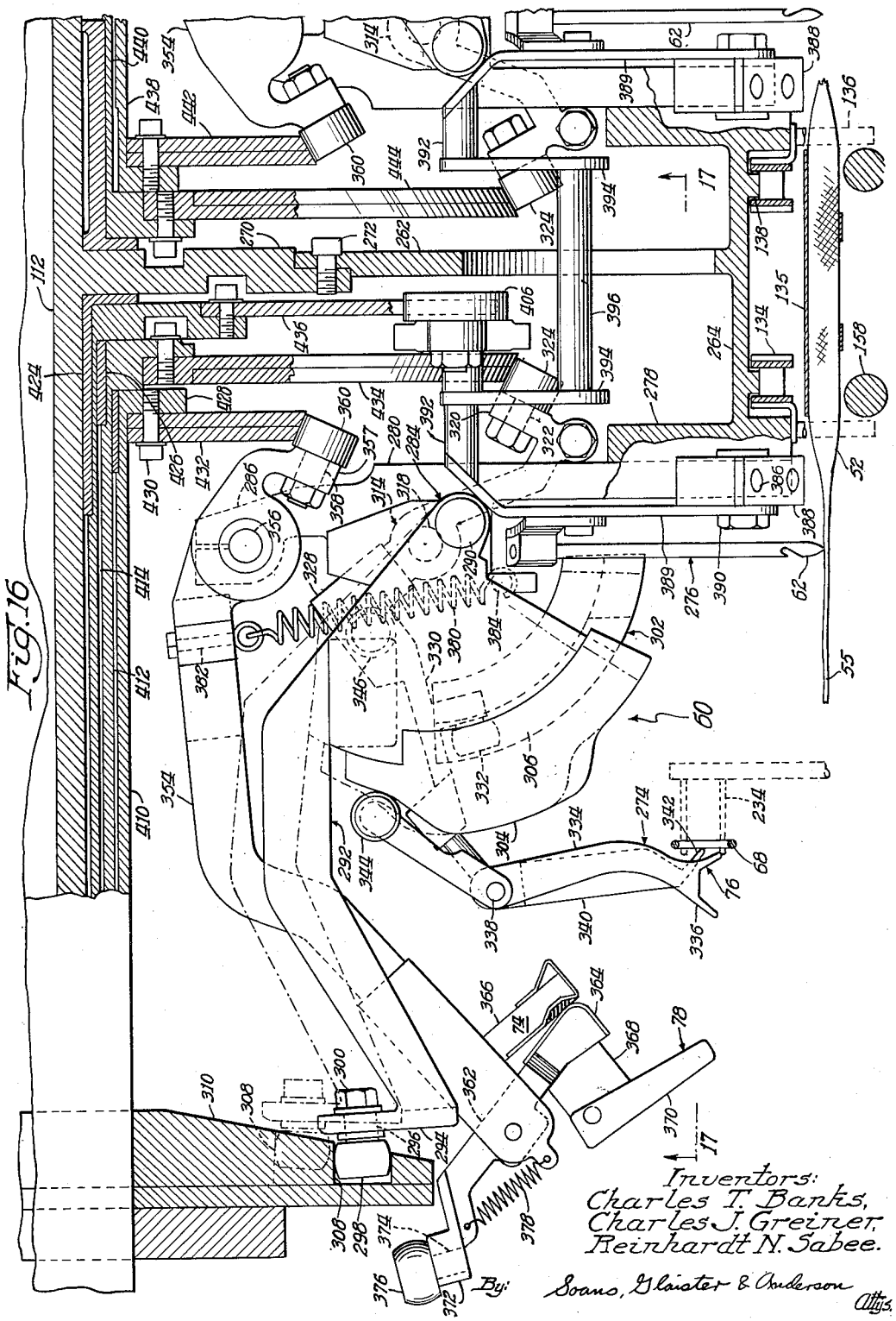

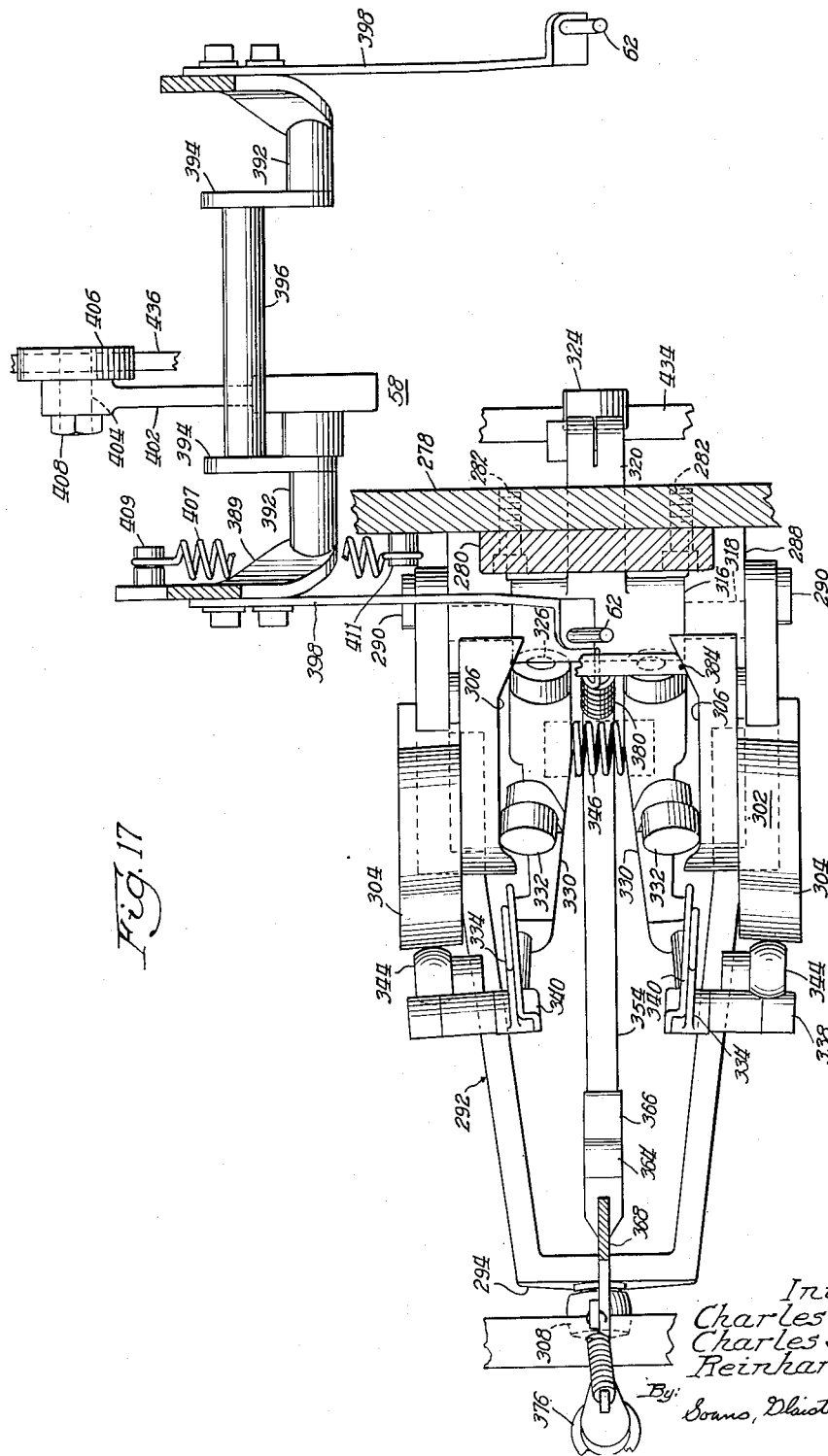

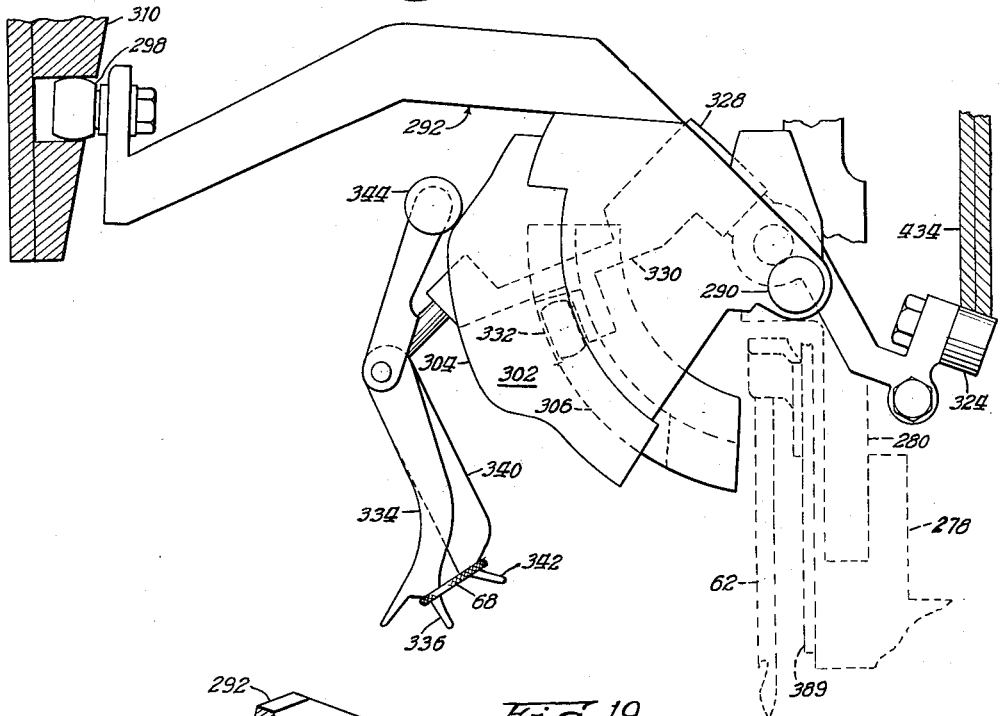
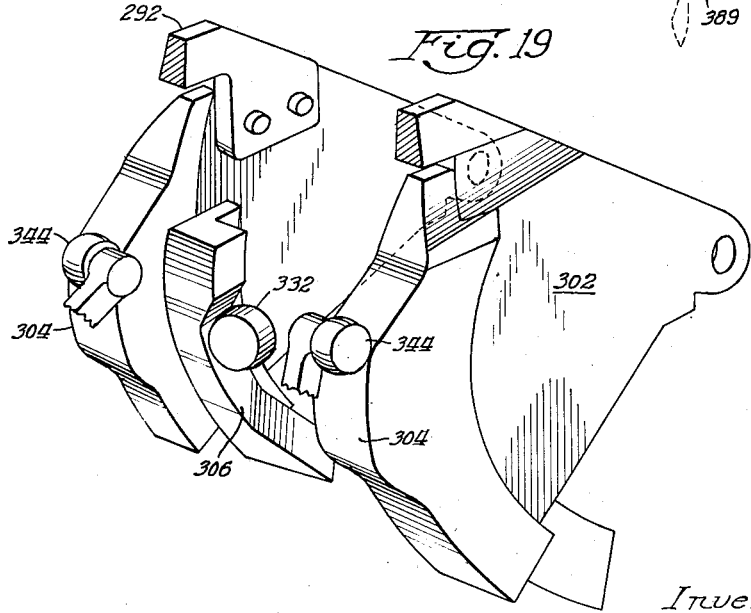

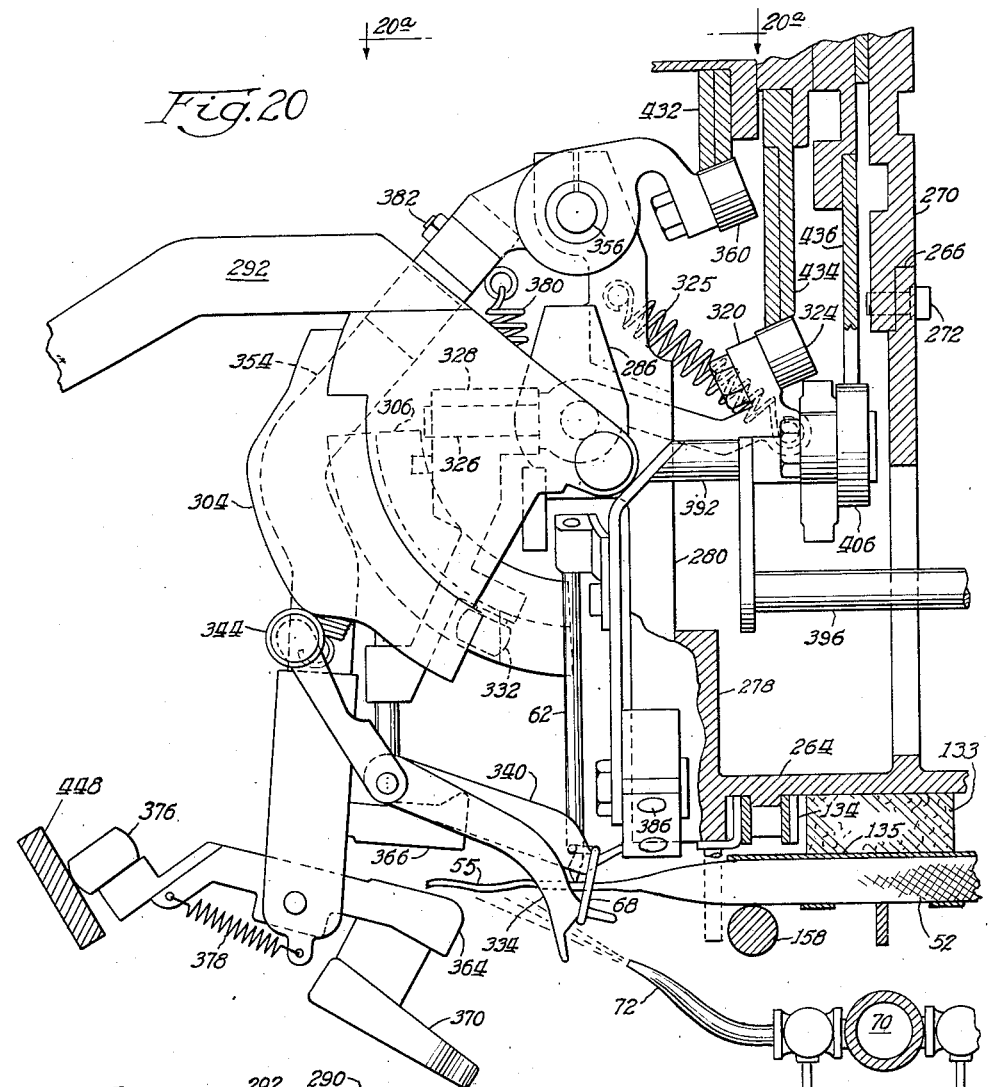
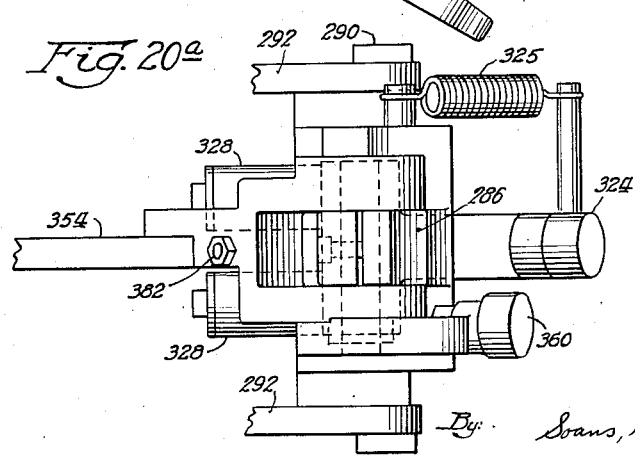

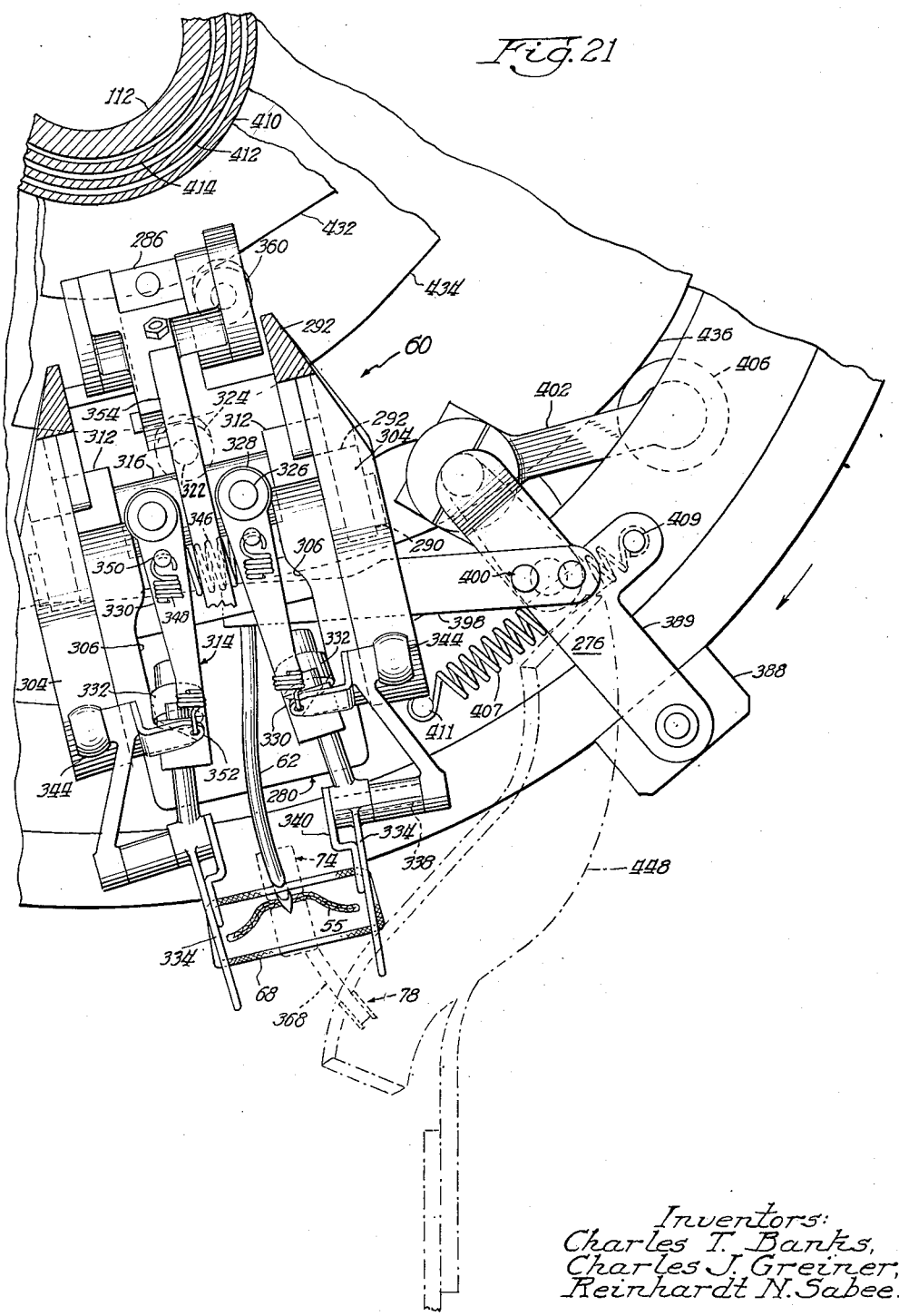

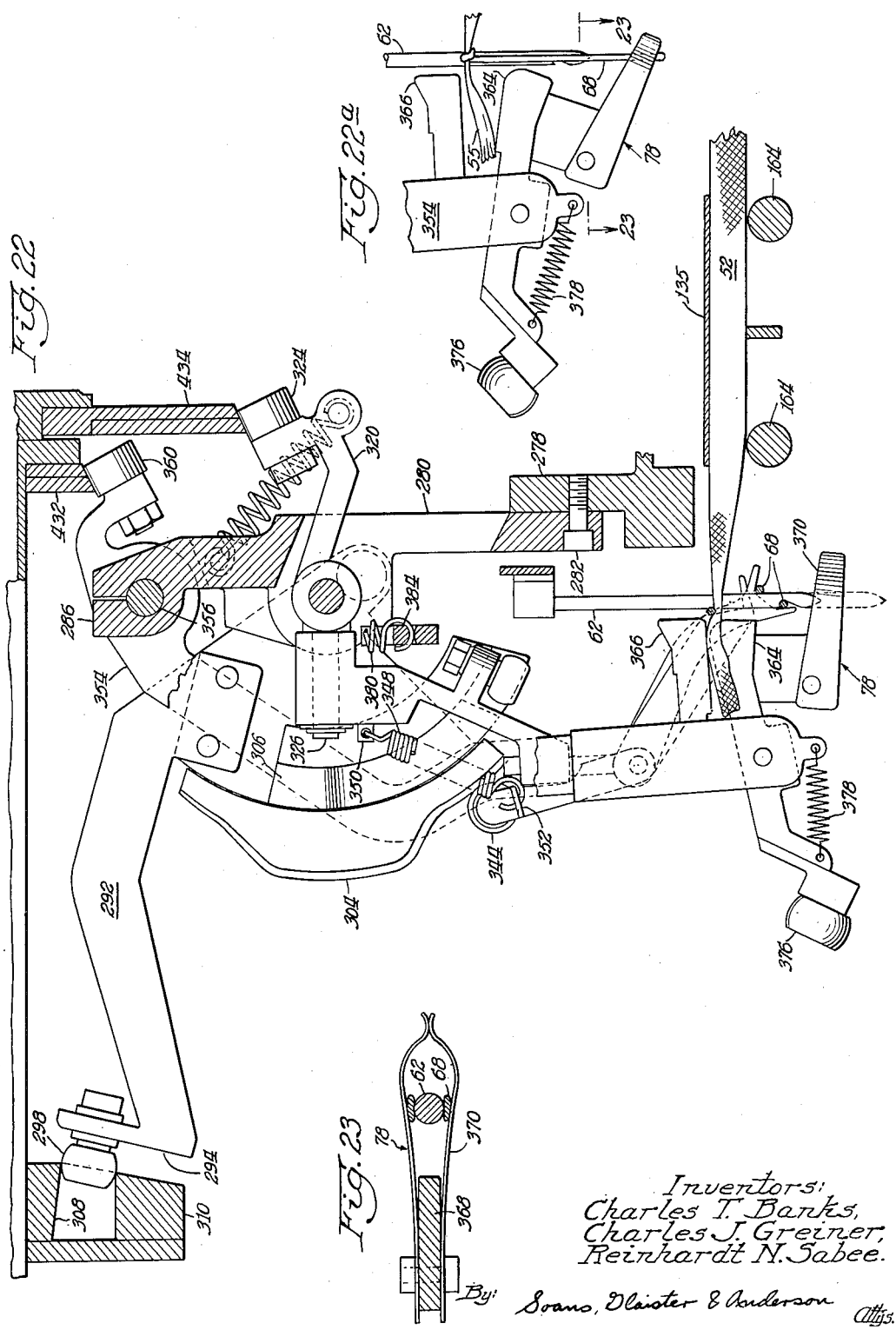

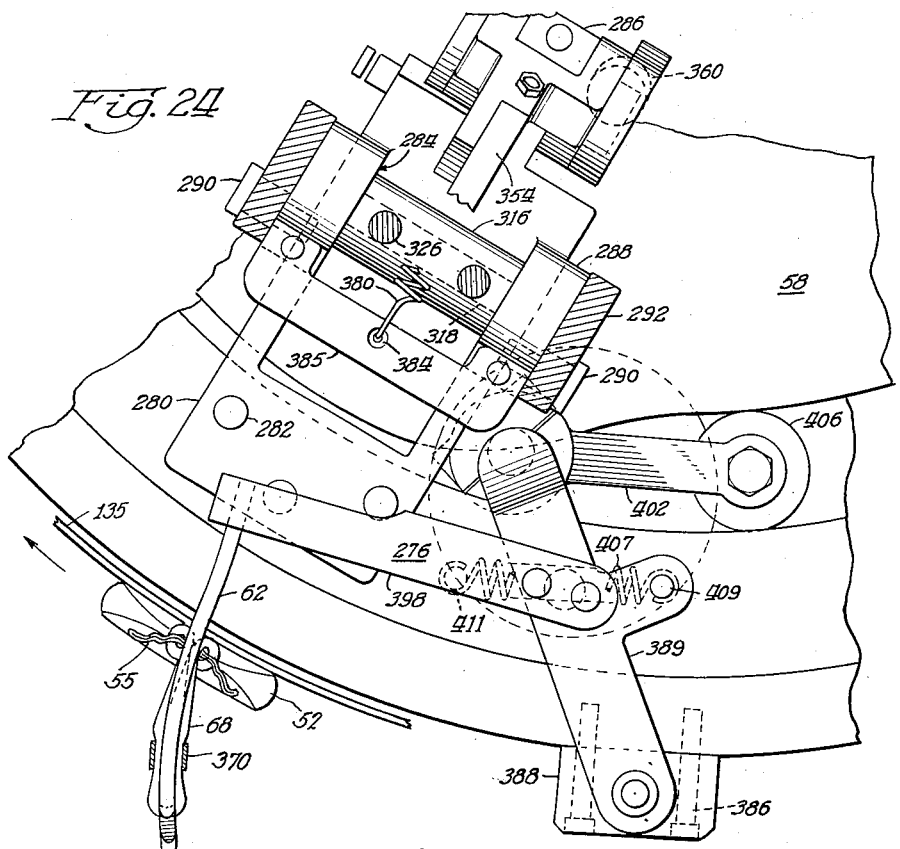
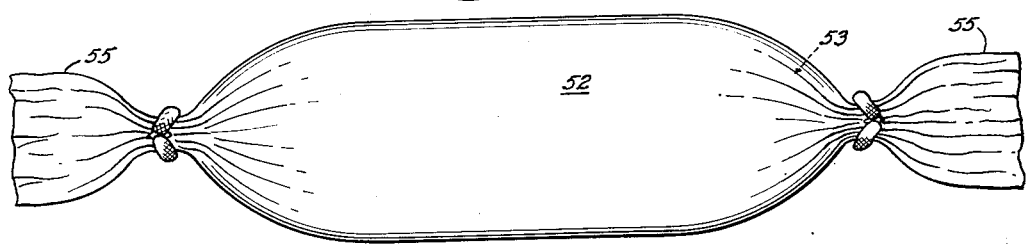
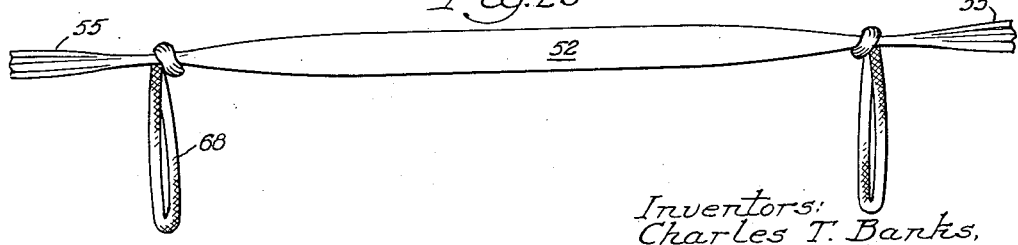

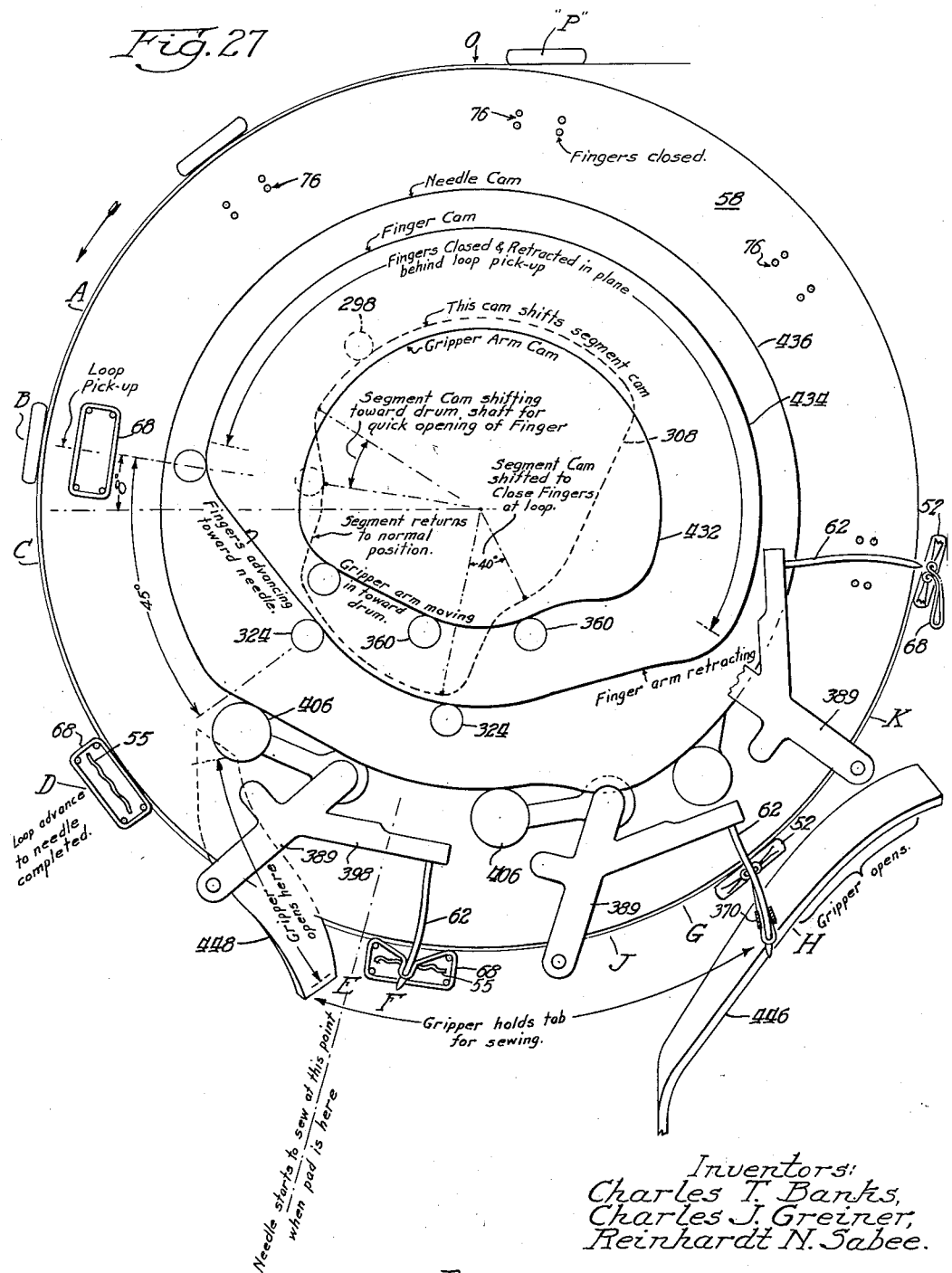

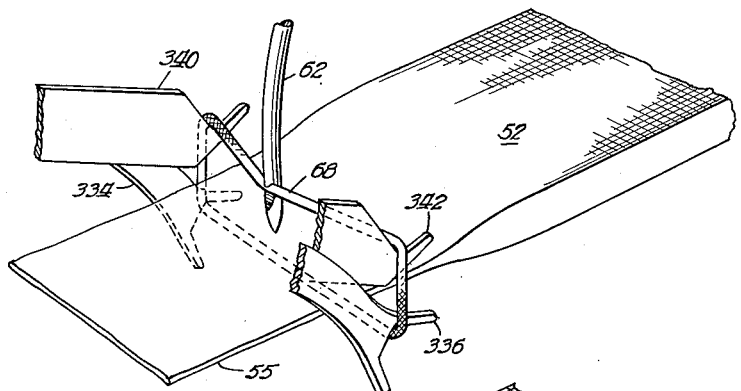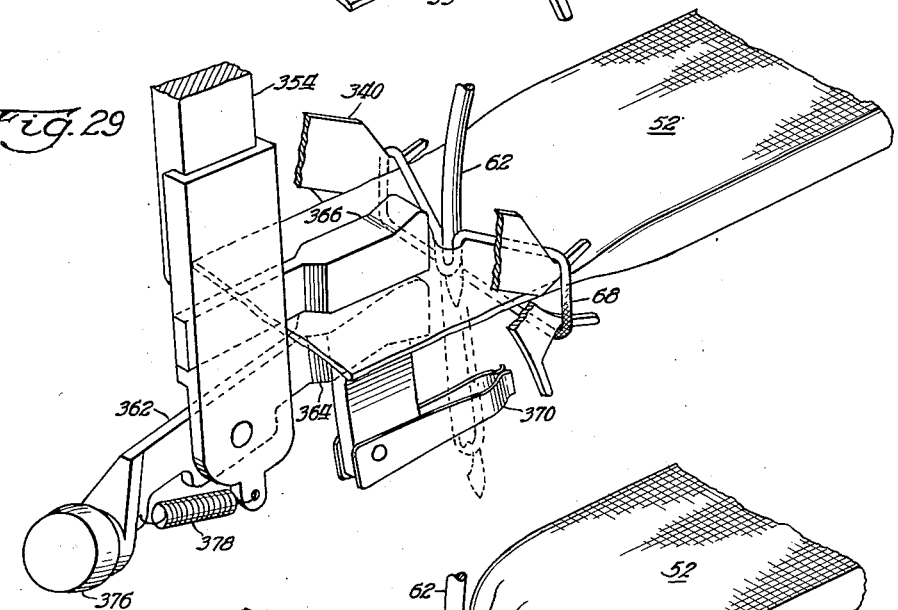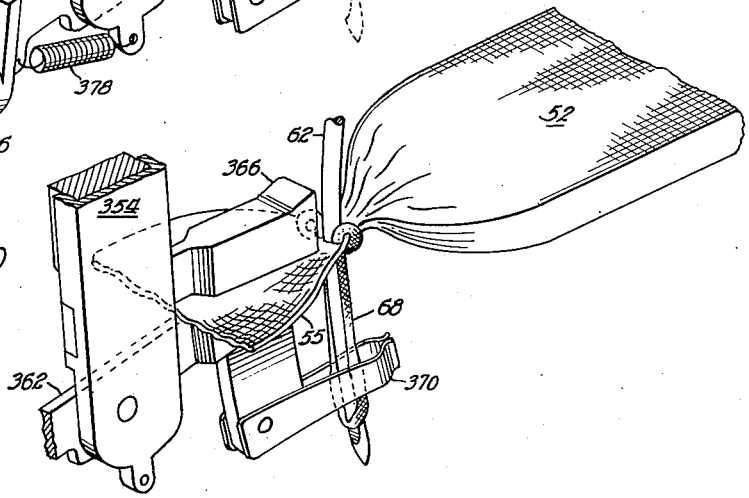

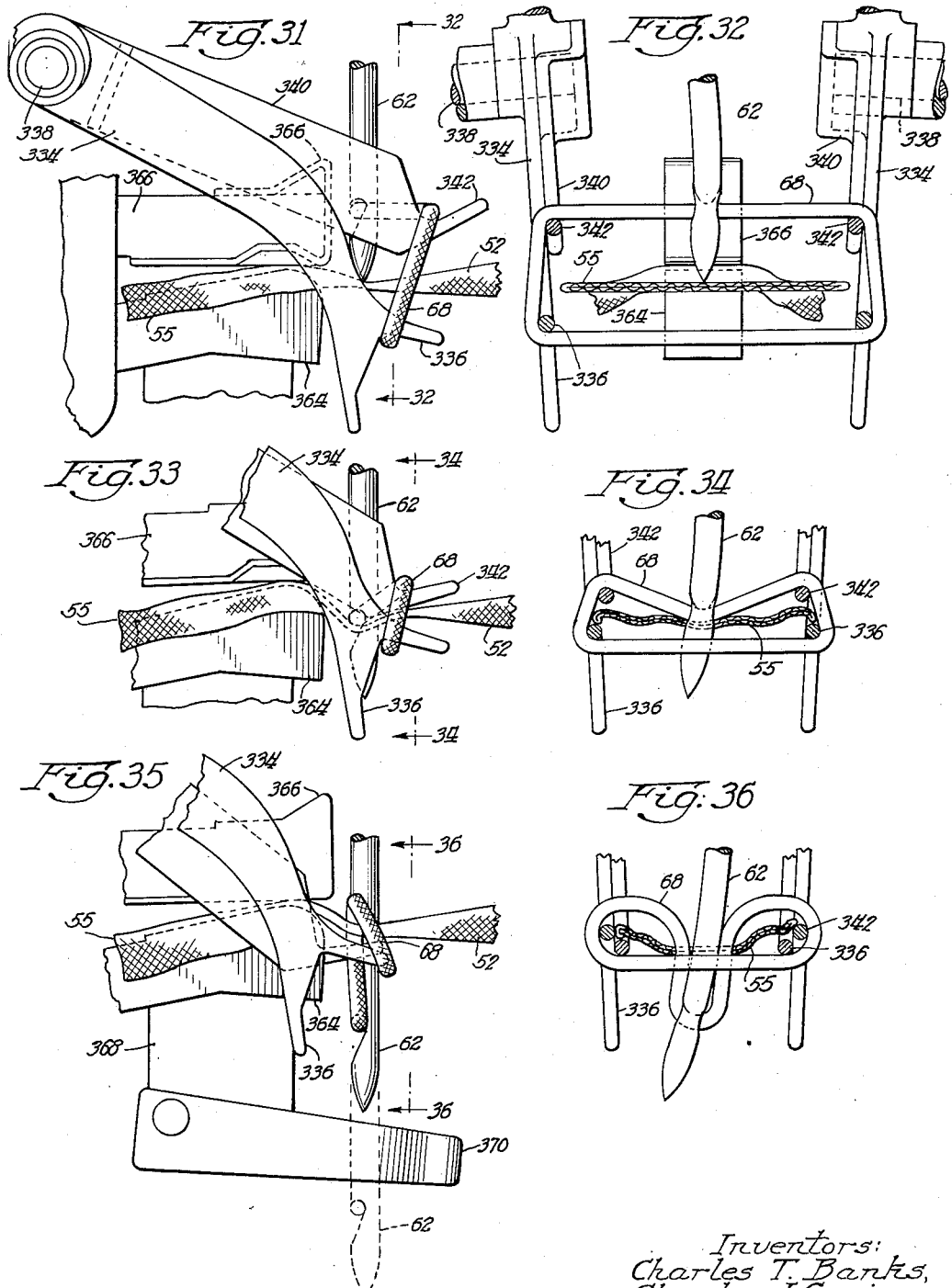

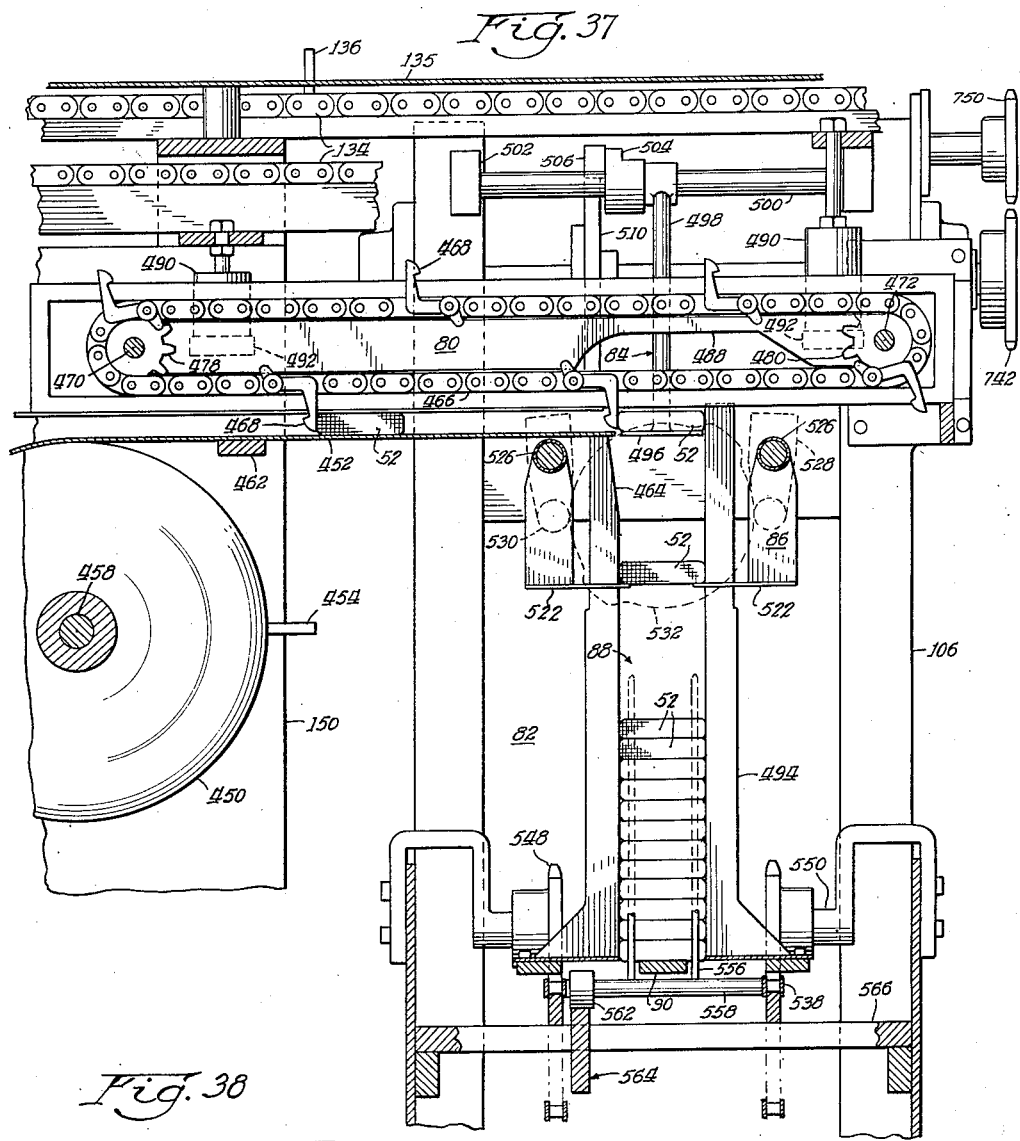
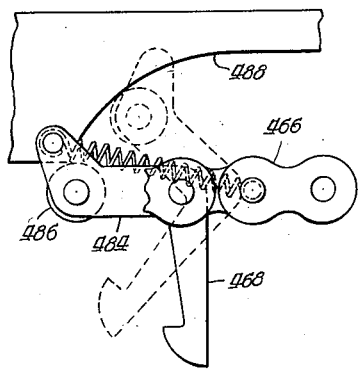
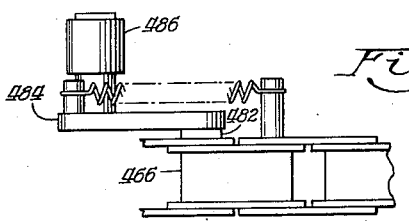

Inventors:
Charles T. Banks,
Charles J. Greiner,
Reinhardt N. Sabee.
By Souno, Plaister & Anderson
Attys.

Aug. 21, 1956     C. T. BANKS ET AL     2,759,441
METHOD AND APPARATUS FOR THE MANUFACTURE OF SANITARY
NAPKINS WITH ATTACHMENT LOOPS
Filed April 14, 1952     25 Sheets-Sheet 22
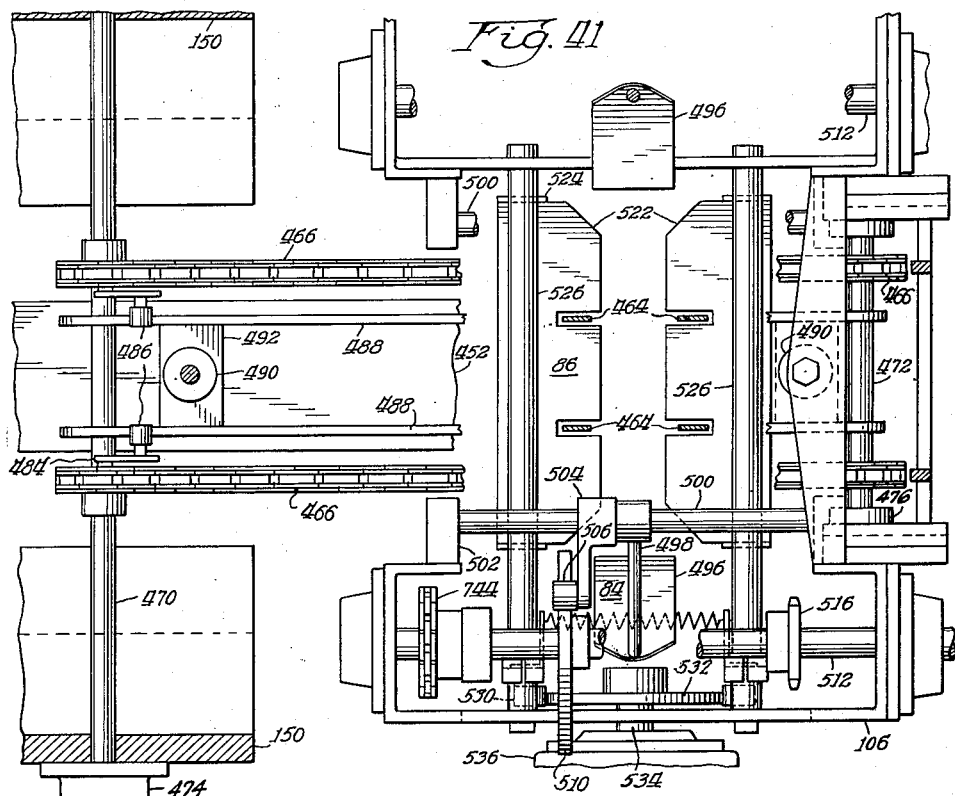
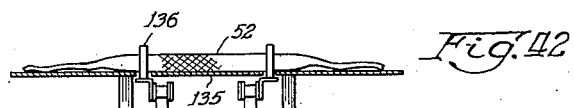
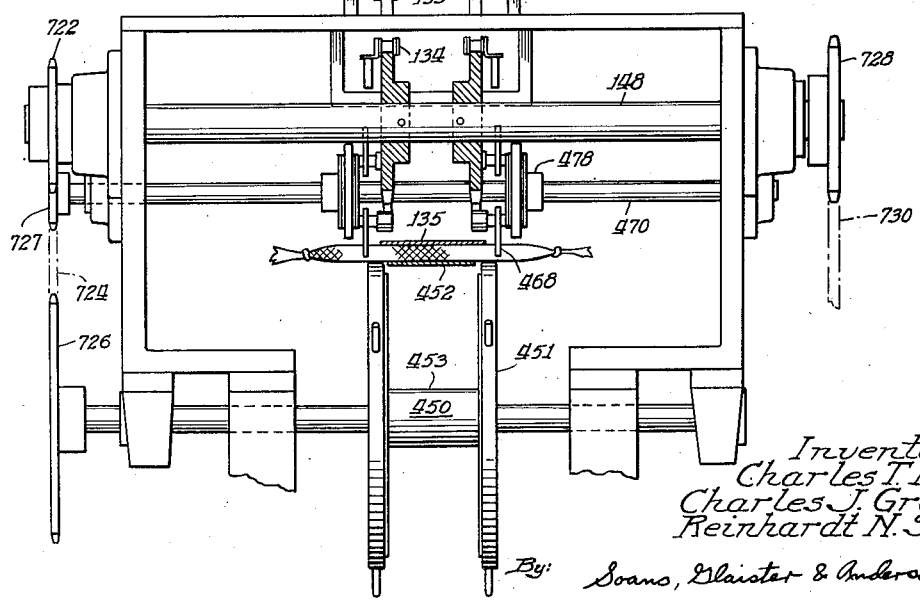
Inventors:
Charles T. Banks,
Charles J. Greiner,
Reinhardt N. Sabee.
By: Soans, Glaister & Anderson
Attys.

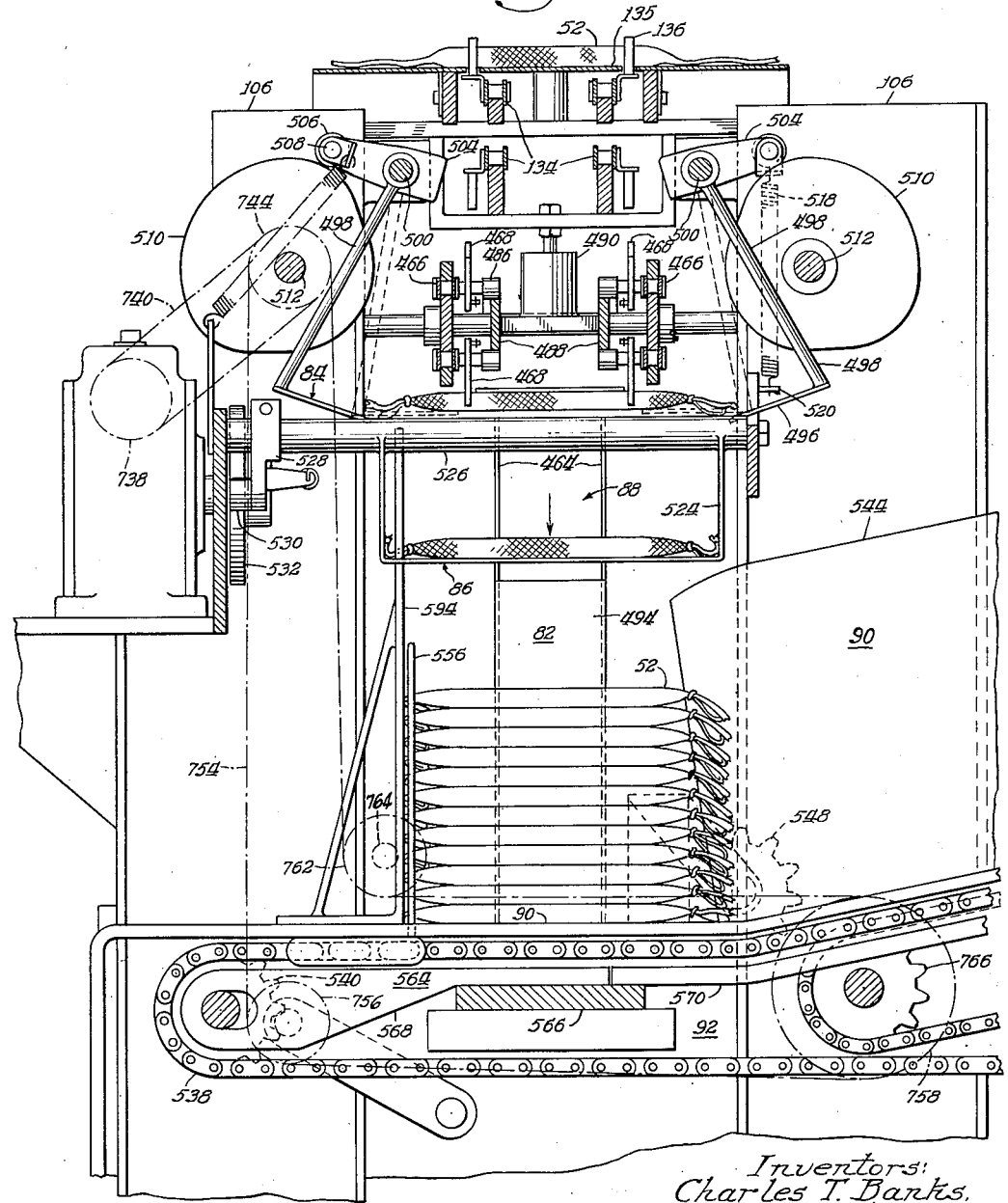

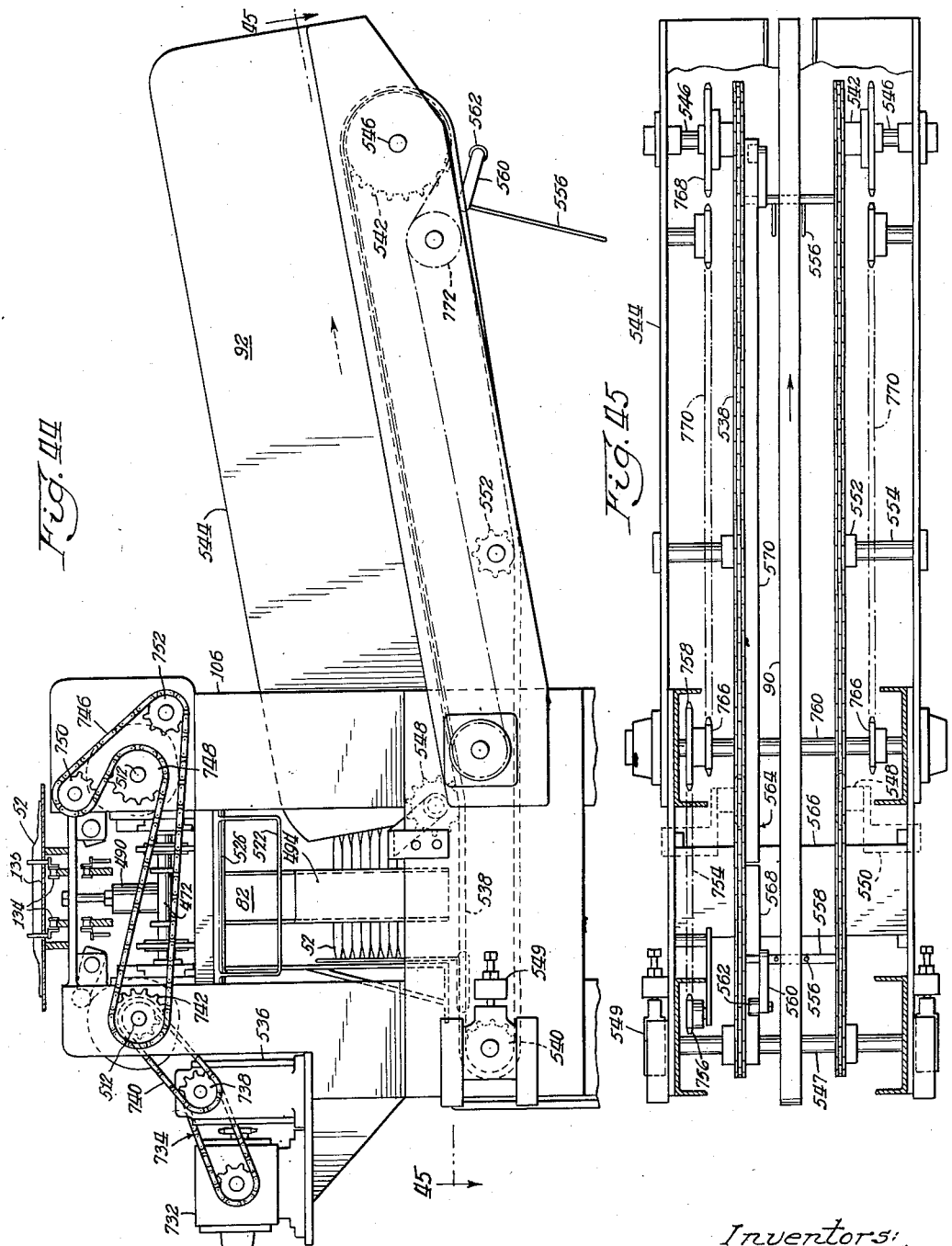

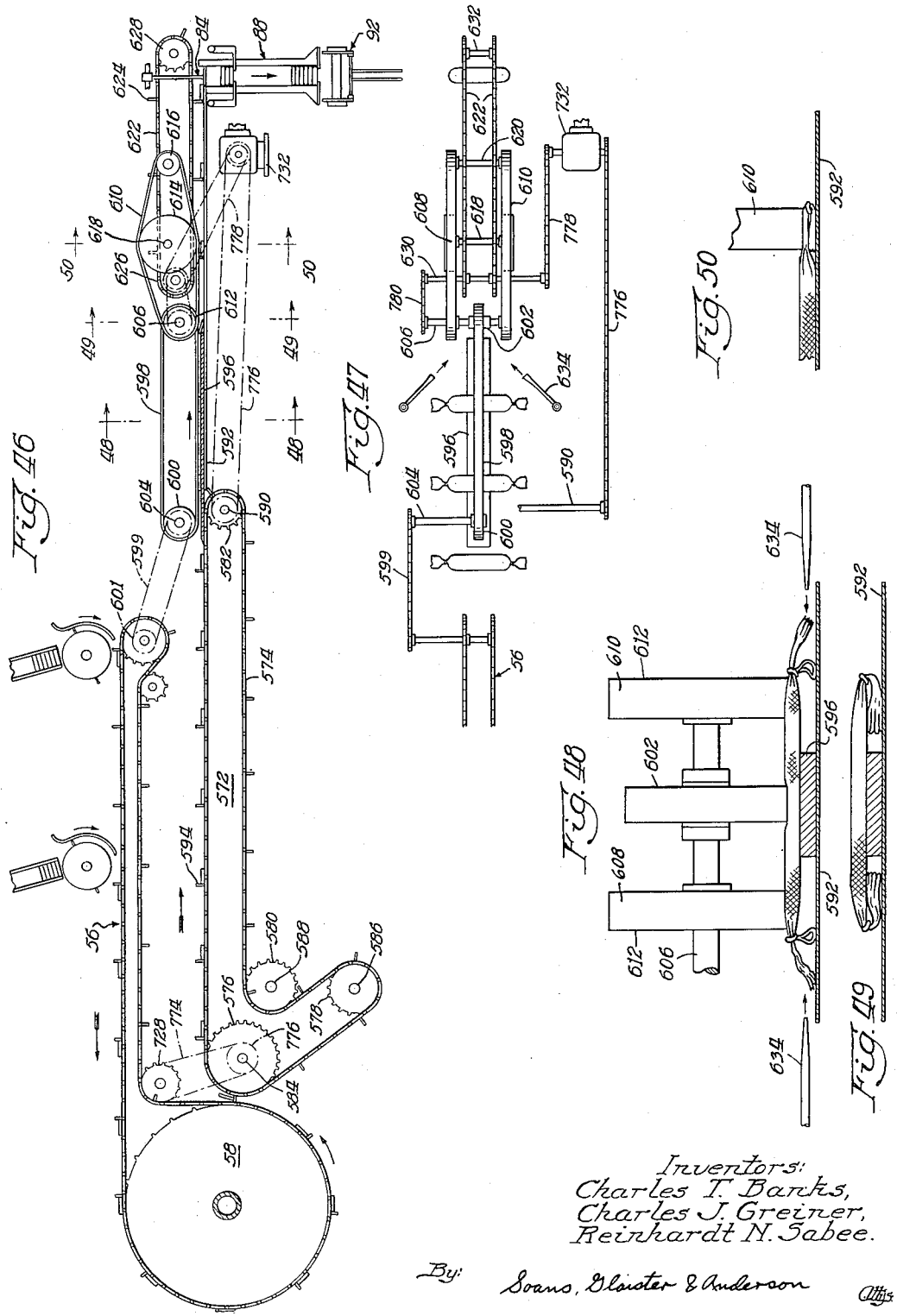

United States Patent Office 2,759,441
Patented Aug. 21, 1956

2,759,441

METHOD AND APPARATUS FOR THE MANUFACTURE OF SANITARY NAPKINS WITH ATTACHMENT LOOPS

Charles T. Banks, Neenah, Charles J. Greiner, Menasha, and Reinhardt N. Sabee, Appleton, Wis., assignors, by mesne assignments, to Kimberly-Clark Corporation, a corporation of Delaware Application April 14, 1952, Serial No. 282,136

19 Claims. (Cl. 112—2)

This invention relates to the manufacture of articles, such as sanitary napkins, wherein attachment loops are secured to opposite end portions of each article.

In the use of sanitary napkins in foreign countries there is a definite preference for a pad having an attachment loop at each end and, accordingly, there have been devised numerous ways for securing such loops to the gauze wrapper of the pad. Quite naturally, this addition of the loops involves additional operations and materials, both contributing to the cost of the sanitary napkin. The expense of the loop material is somewhat offset by the fact that the length of the wrapper material can be shortened with respect to those normally provided on sanitary napkins, when attachment loops are not used. However, the additional handling of the sanitary napkins, necessary to the fastening of the loops to the tab ends of the wrapper, is an important factor in the cost of production as well as being a deterrent to the maintenance of a high rate of production of the item. The latter is particularly true in previously known methods and apparatus wherein the attachment of the loop and the delivery of the looped pad to the packaging station involve a number of individual operations for which the pad must be stopped in its movement along the assembly line.

It is the principal object of the present invention to provide a method and apparatus for the manufacture of sanitary napkins having attachment loops, which permits continuous movement of the pad from a feeding station through the loop-attaching mechanism to a packaging station.

Another object of this invention is to provide apparatus for the manufacture of sanitary napkins which includes a loop forming device coordinating with a loop attaching means so that the completed loops may be continuously and automatically provided in position for fastening to the pad, without interrupting the movement of the latter toward a packaging device.

Other objects and advantages will be understood by reference to the following specification and accompanying drawings, wherein is illustrated embodiments of the improved method and apparatus comprising the present invention.

In the drawings:

Figure 1 is a schematic illustration of apparatus for preparing and securing the loops to the pads as they move from the feed station to the packing station;

Figure 2 is an enlarged partial plan view of the apparatus, taken along line 2—2 in Figure 1;

Figure 3 is an enlarged end view of the apparatus, taken from the left side in Figure 1 toward the adjacent end of the machine.

Figure 4 is a partial side view of the apparatus, taken along line 4—4 in Figure 3;

Figure 5 is an enlarged end view of a portion of the apparatus, taken generally along line 5—5 in Figure 1;

Figure 6 is a view taken along line 6—6 in Figure 5, with portions in section and broken away;

Figure 7 is an enlarged fragmentary view of the structure shown in Figure 3;

Figure 8 is a sectional view taken generally along line 8—8 in Figure 10, with parts omitted or broken away to more clearly show certain portions of the structure;

Figure 9 is a sectional view taken along the line 9—9 in Figure 8;

Figure 10 is an enlarged sectional view taken along the line 10—10 in Figure 3;

Figure 11 is an enlarged view looking downward along line 11—11 in Figure 7;

Figure 12 is an enlarged fragmentary view of the structure shown in Figure 8;

Figure 13 is an enlarged sectional view taken along the line 13—13 in Figure 10;

Figure 14 is an enlarged fragmentary perspective view of the fabric supporting element shown in the preceding figures, illustrating the effect of the cutter roll on the loop fabric;

Figure 15 is a sectional view taken along line 15—15 in Figure 12;

Figure 16 is an enlarged sectional view of one of the loop-attaching units, taken along the line 16—16 in Figure 3;

Figure 17 is a view taken along the line 17—17 in Figure 16, with parts omitted or broken away to more clearly show other portions of the structure;

Figure 18 is a view similar to Figure 16, with the parts of the structure positioned as indicated by the broken line in Figure 16, portions of the structure being omitted in the interest of clarity;

Figure 19 is a detailed view of the cam plate in perspective;

Figure 20 is an enlarged sectional view similar to Figure 16 showing the relationship of parts when the loop-attaching unit has been moved to the position indicated by the line 20 in Figure 4.

Figure 20a is a plan view of the structure in Figure 20, looking down along the line 20a—20a;

Figure 21 is an enlarged section taken along the line 21—21 in Figure 3, with the gripper having engaged the tab end of the sanitary napkin and the needle having started its movement through the tab, the position of the unit being indicated by the line 21 in Figure 4;

Figure 22 is a view similar to Figure 20, with the needle approaching the end of its downward stroke, the position of the unit being indicated by the line 22 in Figure 4;

Figure 22a is a view of a portion of the structure shown in Figure 22 with the gripper fingers having opened, the needle having extended to the bottom of its stroke is withdrawing to its inoperative position;

Figure 23 is a sectional view along the line 23—23 in Figure 22a;

Figure 24 is an enlarged fragmentary sectional view taken along the line 24—24 in Figure 3, with portions of the structure broken away and in section, showing the needle at the bottom of its stroke, the position of the unit being indicated by the line 24 in Figure 4;

Figure 25 is a side elevation of a sanitary napkin having attachment loops in position;

Figure 26 is a plan view of the sanitary napkin shown in Figure 25;

Figure 27 is a schematic illustration of the relative disposition of some of the cams with respect to the cycle of the drum which bears the loop attaching units;

Figure 28 is a perspective view of a portion of the loop attaching unit, in the position shown in Figure 20;

Figure 29 is a perspective view similar to that in Figure 28 with the needle having begun its stitching operation, generally as shown also in Figure 21;

Figure 30 is a perspective view of a portion of the loop attaching unit, the needle having completed its sewing operation as shown in Figure 24;

Figure 31 is an enlarged, fragmentary elevation of the loop-handling unit, the needle being positioned for stitching the loop through the tab;

Figure 32 is a side view, along line 32—32 in Figure 31, of the loop-handling unit;

Figure 33 is an enlarged, fragmentary elevation of the loop-handling unit, the needle having penetrated the tab portion of the sanitary napkin;

Figure 34 is a view along line 34—34 in Figure 33;

Figure 35 is an enlarged, fragmentary elevation of the loop-handling unit, showing the fingers collapsed and the needle retracting toward its inoperative position;

Figure 36 is a view along line 36—36 in Figure 35;

Figure 37 is a sectional view along line 37—37 in Figure 2;

Figure 38 is an enlarged fragmentary view of the structure shown in Figure 37;

Figure 39 is a plan view of the structure shown in Figure 38;

Figure 41 is a plan view of the structure in Figure 37, with parts broken away and in section;

Figure 42 is a sectional view along line 42—42 in Figure 40;

Figure 43 is a section taken along line 43—43 in Figure 40;

Figure 44 is a reduced-scale end view taken along the line 44—44 in Figure 40;

Figure 45 is a section taken on line 45—45 in Figure 44;

Figure 46 is a schematic illustration of a modified form of the packaging assembly station;

Figure 47 is a fragmentary plan view of the structure in Figure 46;

Figure 48 is a sectional view taken along the line 48—48 in Figure 46;

Figure 49 is a partial section taken on the line 49—49 in Figure 46, illustrating the sanitary napkin with its tab ends folded under the main portion of the pad; and Figure 50 is a partial section along line 50—50 in Figure 46, illustrating the pressing action of the rearwardly disposed belts on the folded end portions of the sanitary napkins.

*General arrangement of machine parts*

Figure 40:
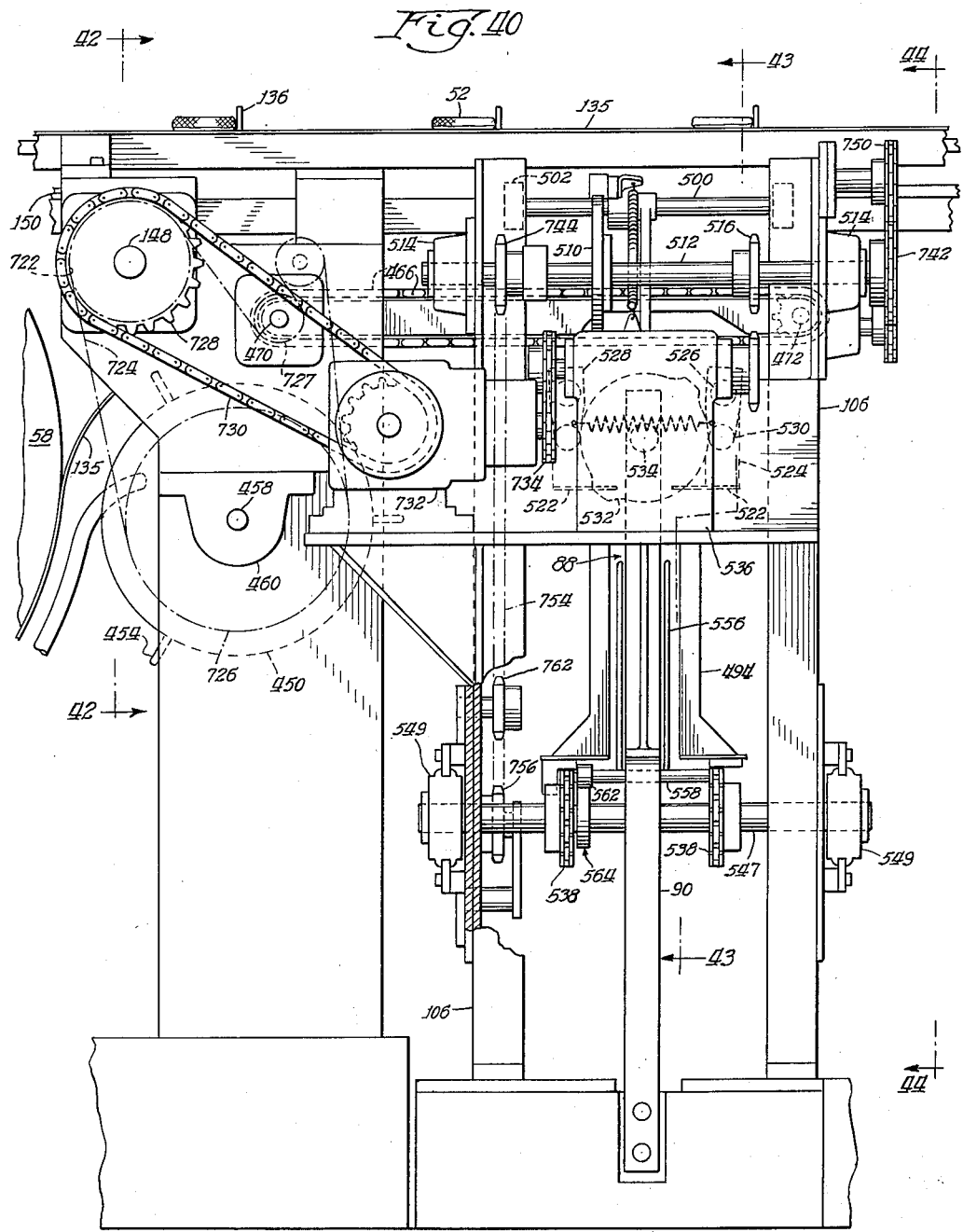
Figure 40 is an elevation taken along line 40—40 in Figure 2.

Referring particularly to the assemblies shown in Figures 1–4, it is seen that the illustrated embodiment of applicants' invention comprises a generally elongated machine 50 having structure providing for introduction of an article, such as a sanitary napkin 52, at one end of the machine and utilizing endless conveyor mechanisms for transporting the article through the machine.

The sanitary napkin 52, illustrated in connection with the disclosed structure, is a well known form of catamenial bandage comprising an absorbent element or pad 53 (Figures 25 and 26) with a gauze wrapper, or other suitable, flexible material, having end portions or tabs 55 extending from either end of the absorbent element. The present invention is directed to a method and apparatus for securing attachment loops 68 to the tabs 55.

The illustrated machine 50 includes a feed station 54, where the sanitary napkins 52 are placed by any suitable means, and from which they are carried in uniformly, spaced-apart relation on an endless conveyor mechanism 56 to a continuously rotating drum 58. The drum has a plurality of loop-attaching units 60 arranged on both sides thereof for movement with the drum. As will be seen later, these units operate to position a formed loop of knitted fabric on each end of the sanitary napkin 52 and secure the loops in position on the napkin, as by a sewing action involving the use of a needle 62 wherein the loop material serves as the thread for the needle.

Adjacent the outer edge of the drum 58, there is provided, at the left end as viewed in Figure 1, a loop forming device 64 which receives a continuous strip of tubular knitted fabric 66, generally referred to as stockinet, and forms therefrom a series of loops 68 to be secured to opposite ends of each of the sanitary napkins as they move around the drum 58. The operation of the loop-forming device 64 is timed with the operation of the drum and the units 60 mounted thereon, so that a loop 68 of the knitted tubular fabric is delivered to each of the opposing pairs of the loop-attaching units 60 as the latter reach a predetermined point in their path of rotation with the drum 58.

Also, cooperating with the mechanism on the drum is an air pressure apparatus 70 comprising a series of air nozzles 72 disposed adjacent the lower peripheral portion of the drum 58. Through this apparatus there is directed a plurality of streams of air in the general direction of the drum 58, which maintain the tab portions 55 at each end of the sanitary napkin 52 in outwardly extending relation to the pad. When thus extended by the air pressure from the nozzles 72, the tabs 55 are positioned to receive the loops 68 and, also, to be grasped by a set of gripper fingers 74 (Figure 16) on each of the loop-attaching units 60. A suction means may be used to accomplish this same purpose.

The loop-attaching units 60 include a set of relatively movable, loop-handling fingers 76 (Figure 16) which receive the finished loops from the lower end of the loop forming device 64 and move them into the path of the air-blown tab 55 for encirclement of the latter. As noted previously, there is also provided on each loop-attaching unit, the set of gripper fingers 74 which grasp the tab 55, after the loop 68 has encircled it, and hold it firmly while the needle 62 passes a portion of the loop through the tab, as seen, for example, in Figure 36.

After the loop 68 is secured to the tab 55, the gripper fingers 74 open, and a loop-tightening element 78 (Figure 16) which is positioned below the gripper fingers contacts the lower end of the loop, wiping it off the needle 62, and pulls the loop tight on the tab end of the napkin 52. It should be noted that the movements just described in connection with the securing of the loops 68 to the sanitary napkin follow the rotation of the drum 58 and are accomplished, therefore, without interruption of the continuous motion of the napkin 52 through the machine 50.

The loop-attaching operation is completed as the sanitary napkin 52 reaches the rear side of the drum 58 (the right side as viewed in Figure 1), where a second endless conveyor mechanism 80 (Figure 1) takes the napkins to a packaging assembly station 82 where the looped sanitary napkins are grouped for placement in a box. Briefly, this packaging assembly station comprises a first horizontal gate structure 84 (Figure 43) which receives each sanitary napkin from the conveyor 80 and then opens to allow the napkin to fall to a lower gate 86.

As the lower gate collects a predetermined number of sanitary napkins, the two sections thereof swing away from each other to release the napkins which fall through a chute 88 to a fixed center strip 90 of an endless conveyor mechanism 92. The endless conveyor 92 is so arranged that as a predetermined number of sanitary napkins, twelve in the illustrations, accumulate on the center strip they are carried away to a suitable packaging machine (not shown). As will be seen later, this particular method of collecting the napkins for packaging is important to the continuous flow of sanitary napkins through the subject machine.

For supporting the above described elements of the machine, there is provided suitable frame structures including a pair of base sections 94 and 96 (Figure 1). The base portion 96 at the right side of the machine has a pair of laterally spaced vertical frame structures 98 (only one of which is shown) suitably fixed thereon for supporting the adjacent end of the conveyor mechanism 56 and the magazine feed structure 54. Suitable lateral bracing is provided between these vertical frame structures by cross members 100, 102 and 104 which are spaced longitudinally of the machine.

Ahead of the structure just described (to the left in Figure 1) and supported by the base portion 96 there is provided, on either side of the machine, a pair of spaced-apart, vertical plate structures 106 which are secured in any suitable manner to the base portion 96, and which support the intermediate portion of the upper conveyor mechanism 56 and the various elements of the packaging assembly station 82. The forward (left) base portion 94 has fixedly mounted thereon in vertically extending relation, a pair of spaced-apart plate members 108 (Figure 2) mounting at their upper edges a pair of aligned journal portions 110 for receiving a rotatable cross shaft 112 (Figure 16) which supports and drives the drum 58.

There is also provided on the forward base portion 94 a second pair of vertically extending plates 114 which support the loop forming mechanism 64 therebetween, and these plates are suitably braced at their upper end portions by a pair of cross brace members 116 (Figure 3). A more detailed account of the particular frame structure in the subject machine is believed unnecessary at this time for a complete understanding of the invention. Additional details will be given as the occasion arises throughout the remainder of the description.

Having in mind the general operation and arrangement of parts in the illustrated machine, it is believed that a description of the sanitary napkin feed mechanism 54, the loop forming mechanism 64, the drum 58 and the loop-attaching units 60, and the mechanism 82 for handling the looped napkins preparatory to packaging, in that order, will best serve to properly explain the invention.

Sanitary napkin feed mechanism

As seen in Figure 1, the apparatus 54 for feeding the gauze-wrapped pads 52 into the machine comprises generally a pair of spaced-apart feed magazines 118 in which the pads may be stacked by any suitable means. A pair of supporting frame members 120 for each of these magazines also support, in underlying relation to the magazines 118, a pair of cylindrical rollers 122. The rollers are fixed to transverse shafts 124 which are suitably journalled at their opposite ends in brackets 126 supported on the frame. Each of the rollers 122 include radially extending fingers 128 for taking a single sanitary napkin from the magazine and moving it past a slide element 130 to the endless conveyor mechanism 56, it being understood that the fingers 128 on the rollers 122 are so spaced that each of the two rollers feed a sanitary napkin on to alternate, uniformly-spaced stations on the endless conveyor 56.

The above described magazine feed apparatus 54 is shown only schematically, since the structure forms no essential part of the present invention. Any other suitable means, including manual operations, may be used to place the sanitary napkins on the conveyor 56. It is, of course, necessary to the most efficient operation of the machine 50 that the napkins be centered on the conveyor with their tab ends 55 extended.

The endless conveyor mechanism 56 includes a pair of spaced-apart, flexible chain drives which support a flexible, endless chain 134 (Figures 1 and 16) having pairs of upwardly extending pins 136 spaced therealong. The chains for the conveyor are drivingly engaged by suitable lugs or projections 138 on the drum 58, which is disposed within the forward portion of the conveyor, and by a pair of sprockets 140 at the rearward (right side in Figure 1) end of the conveyor. The sprockets 140 are fixed to a cross shaft 142 which is supported on bearing structures 144 carried by the cross frame member 104.

Intermediate the laterally spaced chains 134 is a wide metal strap 135 (Figures 1, 6 and 16) which provides a support and guide for the sanitary napkins as they move from the feed apparatus 54 and around the drum 58, under the force of moving pins 136 on the conveyor. The strap 135 is stationary and a leather spacer 133 or the like (Figure 6) is provided around a portion of the drum 58 to maintain the strap 135 in position, while permitting the drum to rotate relative thereto.

The upper and lower flights of the endless conveyor 56 are maintained in close relation, rearwardly of the drum 58, by a pair of sprockets 146 which are positioned adjacent the rear side of the drum. These sprockets are fixed to a cross shaft 148 suitably mounted at either end on a pair of spaced members 150 of the machine frame for rotation relative thereto. A smaller pair of sprocket wheels 152 are positioned immediately forward of the sprockets 140 at the rear of the conveyor mechanism. These sprockets 152 are fixed to a cross shaft 154 carried by aligned journal portions 156 which are mounted on the cross frame member 102.

For maintaining the sanitary napkins 52 in position on the conveyor 56 while they are moving around the drum 58, there is provided a tubular frame structure 158 (Figures 4–6) which extends around a major portion of the periphery of the drum in outwardly spaced relation thereto. The tubular frame 158 is supported in fixed relation to the drum 58 by a set of four vertical legs 160 at the lower portion of the frame which are fixedly supported on the base portion 94 of the machine frame. The upper portion of the tubular frame structure 158 is secured, as by welding, to an overlying member 162 of the main frame of the machine.

As noted in Figure 5, the tubular frame structure 158 comprises a pair of spaced-apart members 164 which support therebetween straps 166 of resilient metal in position to maintain the sanitary napkins 52 in firm contact with the conveyor chain 134 (Figure 6). These curved metal straps extend around the upper periphery of the drum, and at the lower periphery of the drum 58 there is provided a curved tubular member 168 (Figure 6) serving also as a guide and support for the sanitary napkins during their movement with the drum. It is understood, of course, that any other suitable means may well be employed for keeping the sanitary napkins on the conveyor belt in their travel around the drum.

Loop forming mechanism

Referring particularly to Figures 7–15, the mechanism 64 for forming a series of loops 68 from a knitted fabric tubing 66, sometimes referred to as stockinet, will be described. As seen in Figure 3, the loop forming mechanism comprises two identical structures 64 which are disposed on opposite sides of the drum 58 in position to supply loops to the two tab portions 55 of each napkin 52 as it is carried by the drum around a circular path. It is believed that a description of one of the loop forming structures 64 will be sufficient for adequate disclosure of the present invention.

Each of the loop forming mechanisms 64 comprises generally an upper mandrel 170, a lower mandrel 172, and a severing mechanism 174. The loops 68 are formed from the knitted fabric tubing 66 which may be fed on to the upper mandrel 170 from any suitable source which is not shown. This material is ordinarily packaged by the manufacturers in rolled strips with the tubing collapsed, and the top portion of the upper mandrel is, therefore, preferably tapered to slidably receive the flattened fabric tubing in covering relation thereto.

A series of pins or fingers 176 which are supported on endless chains 178, driven by a pair of vertically spaced sprockets 180, engage the knitted fabric on opposite sides of the mandrel 170 and pull it downwardly over the mandrel. In this respect, it will be noted from Figures 10 and 11 that the upper mandrel is generally oblong in cross-section, and each of the curved, narrow side portions have a groove 182 therein extending the length of the mandrel. Consequently, the fabric on the upper mandrel 170 is stretched over these grooves to present a surface through which the pins 176 can pierce and draw the fabric downwardly over the mandrel, as the endless chains 178 move in that direction.

Looking also at Figure 8, it is seen that the broader sides of the upper mandrel 170 include a pair of oppositely facing semi-cylindrical recesses 184 formed therein adjacent the top of the mandrel. These recessed portions cooperate with a pair of rotatable cross shafts 186 and 187, having portions engaging the recessed surfaces of the mandrel, to provide the sole support for the upper and lower mandrels. The mandrel engaging surface portions of the shafts 186 and 187 are preferably rubber covered to assist in drawing the knitted fabric tubing 66, which passes between the mandrel 170 and the shafts, downwardly over the mandrel. These shafts 186 and 187 are driven by suitable means to be described later together with the description of the drive means for other elements in the loop forming mechanism.

The lower mandrel 172 is suspended from the upper mandrel 170, in spaced relation thereto, solely by a wire 188 suitably fixed within the adjacent end portions of the two mandrels. Intermediate the two mandrels there is the fabric severing mechanism 174 comprising an anvil roll 190 and a cutter roll 192 (Figure 8) which are rotatably disposed on either side of the wire 188 just mentioned. These rolls are fixed to cross-shafts 194 and 196 suitably journaled at their ends in a pair of vertically disposed plate members 198 secured to the cross braces 116 of the supporting frame structure (Figure 11).

The anvil roll 190 is formed with a peripheral groove 200 having sufficient depth to receive the wire 188 connecting two mandrels, in embedded relation thereto. Furthermore, a series of circumferentially spaced recesses 202 (Figure 11) are formed along either edge of the anvil roll to provide clearance for the fingers 176 on the endless chains 178 as they move downwardly past the severing mechanism 174.

The cutter roll 192 includes a series of transversely disposed knives 204, equally spaced along the periphery of the roll, each of which contact the anvil roll briefly as they rotate with the cutter roll. Consequently, as the fabric tubing 66 is drawn down over the lower tapered end of the upper mandrel 170, it is collapsed into a ribbon and pressed between the anvil roll 190 and the cutter roll 192 for severance by the knives 204. However, since the wire 188 is embedded in the anvil roll, no appreciable pressure is exerted by the cutting knives 204 on the portion of the fabric overlying the wire and a thin strand of uncut threads 206 (Figure 13) is left connecting the nearly severed portion of the fabric tubing to the continuous strip 66 above.

The upper end of the lower mandrel 172 is substantially pointed and then tapers outwardly and downwardly so that it may receive the flattened material as it passes from the severing mechanism 174 and cause the material to stretch width-wise. It will be noted that the two flights of fingers 176, adjacent the upper mandrel 170, extend downwardly to a point along the upper portion of the lower mandrel 172 and thereby insure continuous movement of the fabric through the severing mechanism and on to the lower mandrel.

Another endless chain 208 with fingers 210 projecting therefrom is disposed adjacent one side of the lower mandrel 172 for grasping the fabric and pulling it downwardly over the mandrel. The fingers 210 are bent so as to be disposed at generally right angles with respect to the fingers 176 on the upper chains 178, and the upper and lower flights of chains 178 and 208 overlap in their respective paths of contact with the loop material 66. The chain 208 is supported and driven by sprockets 212 and 213 fixed, respectively, to an upper cross shaft 214 and lower cross shaft 216 which are suitably journaled at their opposite ends on the vertical frame members 198.

Adjacent the upper end of the lower flight of fingers is a hold-down element 218, which functions to momentarily hold each of the partially severed sections of loop material in place against the upper end of the lower mandrel 172, in order that the action of the downwardly moving fingers 176 and 210 may tear the section loose from the fabric above. The hold-down element 218 includes an arm 220 is fixed to a stub shaft 222 (Figures 10 and 13) journaled at one end in a suitable bearing 224 provided on the frame member 198. Also fixed to this stub shaft 222 is an arm 225 having at its free end portion a roller 226 engaging a cam 228 which is supported on and driven by still another cross shaft 230 rotatably supported by a sleeve bearing 231. The sleeve 231 is fixed at one end to the frame member 198, which is disposed on the supporting structure for the loop forming mechanism on the opposite side of the mandrel 172. The roller arm 225 is biased by a spring 232 (Figure 13), which is connected between the frame member 198 and the arm, to provide for constant engagement of the roller with the cam 228.

Looking particularly at Figures 8 and 13, it is seen that the lower mandrel 172 is tapered at both ends and has a relatively thick intermediate portion. This particular configuration of the mandrel provides a varying resistance to the downward movement of the severed sections of loop material and causes the portion of the fabric on the side of the mandrel opposite the fingers 210 to lag. This lag in movement, together with the elastic characteristic of the material, causes the knitted material to roll and form a ring or loop 68.

Also, the configuration of the lower mandrel causes the loop to move downwardly in a manner such that the loop 68 is finally presented at the lower end of the mandrel 172 in an open and generally vertical position. As the loop 68 assumes this generally vertical position at the lower end of the mandrel, a pair of horizontally, spaced-apart pins 234, carried by a pivoted arm 236, swing into position to grasp the loop from the mandrel. The arm 236 is fixed to a shaft 237, journaled in a bearing 238 on the frame member 198 (Figure 10), and has an upward extension 239 supporting a roller 240 at its end in engagement with a cam 242. The cam is fixed to an extension of the shaft 230, carrying the cam 228 operating hold-down element 218, for rotation therewith. The loop 68 is held by one of the fingers 210 on the endless chain and by the pins 234 as it moves downwardly with the endless chain 208. At such position in its travel, referred to hereinafter as the pick-up station S (Figure 7), the loop is ready for engagement by the set of vertically and horizontally expandable fingers 76 which are carried by the units 60 on the drum 58 in a manner to be explained later. Also, in connection with the pins 234, it will be noted that a spring 235 (Figure 7) is positioned between the arm 236 and the lower mandrel to maintain engagement between the roller 240 and the cam 242.

It will also be noted with respect to the lower mandrel 172 (Figures 8 and 9), that the side facing the flight of fingers 210 is grooved longitudinally to permit extension of the fingers therein for a secure engagement with the loop. Moreover, in order to prevent lateral swinging movement of the mandrels 170 and 172, which have been noted previously to be supported solely by the cross shafts 186 and 187 engaging the recessed surface portions 184 of the upper mandrel 170, there is provided a set of rollers which bear against the four sides of the lower mandrel.

Looking at Figure 7 it is seen that there is a first pair of rollers 246 and 248, which are disposed in vertically spaced relation on opposite sides of the enlarged mid-portion of the lower mandrel 172. The upper roller 246 is carried on a spindle at the free end of an arm 250 which is attached to an adjacent frame member 252 of the machine. The lower roller 248 is similarly supported at the lower end of an arm 254 also carried by the adjacent frame member 252.

A second pair of rollers 256 and 258 are disposed in bearing relation to the remaining two sides of the lower mandrel, as seen in Figure 10. These rollers are each mounted on a spindle carried at the lower end of an arm 260 fixedly attached, as by welding, to an overlying frame member (not shown). Also, it is seen from Figure 7 that the lower roller 248 serves to deter the downward movement of the loop section contacted thereby and thus assists in rotating the loop into a generally vertical position at the pick-up station S at the lower end of the mandrel.

Operation of the loop forming mechanism

Although the manner of operation of the loop forming mechanism has been generally described above, a brief summary of the function of the parts may be helpful. Looking particularly at Figure 10, it is seen that as the knitted fabric tubing 66 is drawn downwardly over the end of the upper mandrel 170, by the action of the rubber covered surface portions of the shafts 186 and 187, the fabric is engaged by the fingers 176. These fingers pull the fabric downwardly through the severing mechanism 174 where uniform sections are cut from the tubing 66 by the action of the cutting and anvil rolls.

As indicated previously, the presence of the wire 188 interconnecting the upper and lower mandrel in the groove 200 of the anvil roll 190 causes a few strands 206 of the knitted fabric to be left uncut (Figure 13). At a point near the top of the lower mandrel 172, the lower flight of fingers 210 engage each of the partially severed sections, in turn, to carry the material downwardly on the mandrel.

In this connection, it should be noted that in moving the loop forming material on to the lower mandrel there is an acceleration in the movement of the material. Referring particularly to Figure 8, it is seen that the length of the sections cut is about a third of the spacing of the fingers 210 which carry the loop sections along the lower mandrel. Consequently, the loop material travels along the lower mandrel 172 at about three times the speed with which it is moved along the upper mandrel 170 and through the severing mechanism 174.

This increase in speed helps in tearing the partially severed section loose from the tubing, but is primarily provided to bring the speed of the movement of the loops 68 in time with the movement of the sanitary napkins on the drum 58. Additional compensation is made in this respect, in the movement of the loop from the pick-up station S to the tab ends 55 (Figure 16) by the fingers 76.

Referring again to Figure 8, the engagement of one of the fingers 210 with a section of the loop material, as it passes downwardly from the severing mechanism 174 is accompanied by a simultaneous engagement of a holddown element 218 with the immediately succeeding section of fabric. Consequently, the further movement of the finger 210 breaks the bond 206 and tears the engaged section free from the upper strip of fabric.

As the finger 210 carries the individual section of the loop material along the lower mandrel 172, the section rolls along its length to form a relatively narrow loop 68. This is due partly to the elastic nature of the fabric but largely to the shape of the mandrel 172. The movement of the loop 68 along the mandrel tends to tighten the roll of the loop to the extent that a quite narrow loop, having the appearance of being tubular in cross-section, is formed.

The action of the fingers 210 in conjunction with the lateral-support roller 248 and a pair of flat springs 260 (Figure 7) is such that the loops are presented to the expandable fingers 76 (Figure 10) of the loop handling mechanism on the drum 58 in a generally vertical position.

Loop attaching mechanism

The mechanism for receiving the loops from the loop forming mechanism 64 and securing them in position on the sanitary napkins 52 is shown generally in Figures 3 and 4. This mechanism comprises generally the rotatable drum 58 which includes a series of eight circumferentially-spaced, loop-attaching units 60 arranged about each of the two side surfaces of the drum.

The drum 58 is generally in the shape of a steel rimmed wheel (Figs. 6 and 16) and comprises a center disc portion 262 and a rim structure 264 formed integrally therewith. The center portion 262 has an enlarged axial opening 266 with a series of bolt receiving openings 268 spaced around the inner edge of the disc, to provide means for attaching the drum to a hub portion 270 on the rotatable shaft 112, as by means of cap screws 272. The rim surface includes the projecting segments or teeth 138, previously mentioned for engagement with the chains 132 of the endless conveyor 56.

The loop attaching units 60 each include a loop-handling structure 274 and a cooperating loop-stitching device 276. Since all of the units are identical in structure, the description will be confined to a single illustrative unit.

The loop-handling structure 274 comprises generally a group of cam operated arms which effect a movement of the loop 68 from the loop forming device 64 to a position encircling the tab end 55 (Figure 16) of the sanitary napkins 52 and in engagement with the needle element 62 of the stitching device 276.

Looking particularly at Figures 16, 21 and 24, it is seen that the rim 264 of the drum 58 includes a flange portion 278 at either side which extends in the direction of the center of the drum. The loop handling structure 274 is bolted, or otherwise secured, to this flange. Specifically, a bearing structure having a base portion 280 is secured to the flange 278 by a series of bolts 282 and extends inwardly toward the axis of rotation of the drum 58. The base portion 280 has formed integrally therewith two axially-spaced pivot mountings 284 and 286.

The pivot mounting 284, which is nearer the rim 264 of the drum than mounting 286, comprises a pair of coaxial, spaced-apart journal portions 288 (Figure 24) which receive a pair of pivot pins 290 secured to the open end portion of a bifurcated lever structure 292 to afford hinged movement of the latter relative to the drum 58. The outer (bight) end portion of the bifurcated lever 292 includes a flanged portion 294 (Figure 17) with an opening therethrough for receiving a spindle 296. The spindle 296 extends through the opening and carries at one end a roller 298, in axially fixed, rotatable relation thereto. The other end of the spindle 296 is threaded to receive a nut 300 for securing the spindle in axially fixed relation to the flange 294.

The intermediate portion of both arms of the bifurcated lever 292 comprises an integrally formed plate 302, which includes two irregular cam surfaces 304 and 306 facing generally at 90 degrees with respect to each other. The roller 298 at the outer end of the bifurcated lever 292 engages an irregular, continuous cam groove 308 formed in a stationary circular plate 310 and, consequently, the rotation of the drum 58 effects a movement of the roller 298 in the cam groove 308 (Figure 16). The undulating motion of the roller 298 in the groove 308 results in predetermined hinged movements of the bifurcated lever 292 relative to the drum 58.

Adjacent the previously mentioned journal portions 288 for the pins 290 at the inner ends of the bifurcated lever 292, there is another pair of coaxially spaced journal portions 312 (Figure 21). A Y-shaped lever structure 314 includes a transverse bearing structure 316 (Figures 21 and 24) which has an opening therethrough alignable with openings in the journal portions 312. A pin 318 is positioned through these openings to provide a hinge axis for the Y-shaped lever 314. The tail end of the Y, which extends toward the drum 58, includes an angularly projecting bracket 320 having an opening therethrough receiving a spindle 322 for a roller 324 which is held in engagement with the cam surface 434 by a spring 325 (Figure 20) secured between the base 280 and the bracket 320.

The lever 314 also includes a pair of cylindrical arms 326 (Figure 21), each of which form a pivot mounting for a tubular bearing portion 328 of an arm 330 extending generally away from the drum 58. The intermediate portion of the arm 330 includes a spindle mounting for a roller 332 which is positioned for movement along the cam surface 306 described above, with respect to the bifurcated lever 292. The arm 330 has a relatively fixed outer end portion 334 which is bent at an angle to the main portion of the arm and includes a notched end portion with two relatively fixed fingers 336. At the bend in the arm 330 there is provided a pivot mounting 338 for an intermediate section of a lever 340. One end of the lever 340 extends alongside of the portion 334 of the supporting arm 330, and has at its outer end a finger 342 which is disposed in close relation to the fingers 336. The other end of the lever 340 rotatably supports a roller 344. This roller 344 is positioned for engagement with the cam surface 304 on the outer edge of the plate portion 302 of the bifurcated lever 292.

The two arms 330 have a compression spring 346 (Figure 17) suitably mounted therebetween to maintain the rollers 332 in engagement with the cam surfaces 306. There is also provided on each of the arms 330 a tension spring 348 (Fig. 21) which is positioned between a lug 350 on the inner end of the arm 330 and a bracket 352 on the roller end of the lever 340, respectively, to maintain engagement between the roller 344 and the outer cam surface 304 of the plate 302.

The inner end of the base portion 280 of the loop handling structure 274, that is the end nearest the axis of the drum 58, includes the fixed bearing structure 286 having an axis generally parallel to the axis of the other two bearing structures 284 and 314 on the base. This innermost bearing structure 286 affords a hinged connection for a gripper arm 354 which is curved to extend away from the drum 58 and then downwardly toward the rim 264 of the drum. It will be noted from Figures 16 and 17 that this arm 354 extends between the two side portions of the bifurcated lever 292 described above. The inner end portion of the gripper arm is shaped to receive the bearing structure 286 therebetween. A pin 356 or the like is inserted through aligned openings (not shown) in the arm and the bearing structure 286 to hingedly connect the gripper arm to the base 280.

The inner end of the arm 354 also includes a flange 357 having an opening therethrough for receiving a spindle 358 mounting a roller 360. The outwardly extending end portion of the arm 384 is bifurcated to provide a pivot mounting for the mid-portion of a lever 362 which provides at one end the movable lower member 364 of the gripper fingers 74. The upper gripper finger is formed by a short member 366 which is rigidly fixed to the gripper arm 354, at generally right angles thereto. The gripper members 364 and 366 are preferably rubber covered (Figure 16) to assist in their holding the tab ends of the napkins.

The movable gripper element 364 has a bracket extension 368 to which is fastened the loop-tighting element 78. The loop-tightening element comprises a pair of spaced-apart, generally parallel, flat spring clips 370 which are curved inwardly at their free ends for engagement (Figure 23). The end of the lever 362 remote from the gripper 74 includes a bearing structure 372 receiving a spindle 374 carrying a roller 376. A tension spring 378 is disposed between the bearing structure 372 and the adjacent end of the gripper arm 354 to bias the lower member 364 of the gripper fingers into engagement with the upper member 366.

There is also provided means, in the form of a tension spring 380 (Figures 16 and 20), for continuously urging the gripper arm 354 to swing about the hinged connection therefor in the direction of the rim 264 of the drum 58. As illustrated, this tension spring 380 is secured to the gripper arm by means of an eye-bolt 382, and is fixed at the other end through an opening 384 (Fig. 24) in a cross piece 385 connecting the spaced portions of the bearing 284 on the base portion 280 of the loop handling mechanism.

The loop stitching device 276 for each of the loop handling units 60 may be best seen in Figures 16 and 17. This device comprises generally the needle 62, which is positioned adjacent the edge of the rim 264 for movement relative thereto and is located approximately centrally of the width of the base portion 280 of the loop handling mechanism 274.

For convenience in manufacturing, as well as to eliminate duplication of parts, the structure supporting each pair of the needles 62 (one on either side of the drum 58) has been made into a single assembly. It will be understood, however, that separate mountings may readily be employed for each needle, as in the case of the loop handling mechanism.

At opposite edge portions of the drum rim 264 there is secured, as by screws 386, a base mounting in the form of a block 388. Aligned openings through each of these blocks provide a pivot axis for a needle-arm structure comprising generally a yoke having leg portions 389 pivoted to the blocks 388 as by a pair of bolts 390 (Figure 16). This arm structure also includes a pair of short cylindrical sections 392 (Fig. 16) extending within the drum and fixed to the upper end of the legs 389 at right angles therewith. The inner ends of these sections 392 are spaced-apart and have fixed thereto a pair of projecting arms 394, the arms being joined by another cylindrical member 396.

An intermediate portion of each of the legs 389 has securely fixed thereto an arm section 398 which has the needle 62 secured to the end portion thereof (Fig. 24). Adjustment may be afforded for positioning the needle, as by a pin and slot connection 400 between the arm 398 and the leg 389. All of the connections just described, other than the pivot mountings provided by the bolts 390 on the base blocks 388, are rigid and, consequently, movement of any portion of the needle-arm structure effects simultaneous movement of the pair of needles 62 on opposite sides of the structure.

One of the short cylindrical sections 392 of the needle-arm (Fig. 17) has fixed thereto, at generally right angles, a projecting arm 402 having a transverse opening therethrough (not shown). This opening provides a bearing structure for a spindle 404 which mounts a roller 406 and is kept in position by a nut 408 or the like on a threaded end of the spindle. Furthermore, the roller 406 is maintained in engagement with its cam surface 436 by a tension spring 407, which is disposed between lugs 409 and 411 fixed to the arm 389 and the drum 58, respectively (Figs. 17 and 21).

Having in mind the particular construction and arrangement of the parts comprising the loop attaching mechanism 60 it is believed timely to discuss the cam structures which are provided for operation of this mechanism.

Cam structure for loop attaching units

Looking particularly at Figures 3 and 16, it will be seen that the rotatable shaft 112, which carries the drum 58 in fixed relation to its mid-portion, is enclosed by a number of stationary sleeves. These sleeves provide a support for a series of five continuous cam surfaces within the drum 58, which coact with the loop handling structure 60 to effect predetermined movements of the latter.

The outer ends of three of the sleeves 410, 412, and 414, to the left of the drum 58 (Figure 16), include flanged portions 416, 418 and 420 (Figure 3), respectively, which are fastened to three similar brackets 422 projecting upwardly from the side frame member 114 and secured thereto. The inner ends of these sleeves are supported by the rotatable shaft 112 and suitable non-friction bearing means 424 is interposed between the inner sleeve and the rotatable shaft 112 and the hub 270. A pair of collars 426 or the like are positioned around both ends of the two innermost sleeves 412 and 414, to maintain the parallel relation therebetween.

The inner ends of each of the three sleeves 410, 412, and 414, also have formed thereon a flange portion 428 to provide means for the attachment thereto of a generally circular plate structure, as by means of a series of bolts 430. The periphery on each of these circular plate structures is irregularly shaped to provide a cam surface. Thus, the outer sleeve 410 has a cam plate 432 fixed to its inner end for engagement with the roller 360 on the gripper arm 354. The middle sleeve 412 supports a cam plate 434 which is positioned for engagement by the roller 324 on the loop-handling structure 274. The inner sleeve 414 has a cam plate 436 fixed to its inner end for engagement with the roller 406 on the needle arm structure.

The right side of the rotatable shaft 112 is enclosed by two stationary sleeves 438 and 440 which are supported at opposite ends in the manner described above with respect to the sleeves 410, 412, and 414 at the left of the drum 58. Furthermore, the two sleeves 438 and 440 on the right side of the drum carry at their inner ends a pair of cam plates 442 and 444 which are identical to the cam plates 432 and 434, respectively, one the opposite side of the drum 58. The cam plate 442 engages the roller 360 on the gripper arm 354 and the cam plate 444 engages the roller 324 on the inner end of the finger arm 274 of the loop attaching unit 60 on the right side of the drum (Fig. 16).

In addition, there is secured to each of the outer sleeves 410, at an intermediate portion therealong, the generally circular plate structure 310 having the irregular, continuous groove 308 formed therein. As previously mentioned this groove serves as a cam surface for the roller 298 mounted on the outer end of the bifurcated lever 292 of the loop-handling mechanism 274. Attention is again directed to the fact that the bifurcated lever 292 carries the plate structure 302 which was described above as having the two cam surfaces 304 and 306 for engagement by the rollers 344 and 332, respectively, of the finger arm 274.

Still another set of cam surfaces are provided for operating the movable lower jaw portion 364 of the gripper 74, which engages the tab end portion 55 of the sanitary napkins 52. These are best shown in Figure 3 as comprising two identical pairs of curved plates 446 and 448 fixed to the forward base 94 of the machine at each side of the rotatable drum 58. Each of the pairs of curved plates are positioned for engagement by adjacent roller 376 to operate the gripper fingers 74 on their respective side of the drum 58.

As seen in Figure 3, these curved plates 446 and 448 are disposed to engage the roller 376 on the gripper during the downward movement of the loop-attaching unit 60 to open the fingers 74 in readiness for gripping the tab end 55 of the sanitary napkin 52. As the roller 376 passes out of engagement with cam plate 448 the fingers 74 assume a closed position. When the roller 376 moves on to plate 446 the fingers are again opened until the roller passes out of engagement with the plate, at which time the fingers again close.

*Operation of the loop-attaching units*

Referring generally to the assembly shown in Figure 4 and to the schematic illustration of the cam operation in Figure 27, the operation of one of the loop-attaching units 60 as it rotates with the drum will be described. Although the description will be with reference to a single unit, it is to be understood that an identical unit on the opposite side of the drum 58 is simultaneously functioning in a like manner to secure a loop 68 to the other tab end 55 of the sanitary napkin being acted on by the described unit. Moreover, it should be understood that all sixteen units, eight on each side of the drum, function identically with the one to be described, both as to movement of the component parts and as to timing with respect to the cycle of the drum.

Assuming that a particular sanitary napkin "P" is being conveyed, via the endless conveyor 56, to the drum 58, it is to be noted that this sanitary napkin moves opposite one of the loop-attaching units 60 as it reaches the uppermost point on the path of the drum, and that the napkin and unit travel together around the drum unitl the sanitary napkin is taken from the drum by a rotating wheel 450 and sent to the packaging assembly station 82.

During approximately the first 70 degrees of rotation of the drum 58 with the sanitary napkin "P" and loop-attaching unit 60 in aligned position, there is no relative movement of the component parts of the unit. During this period the loop-handling fingers 76 are closed, and in a position remote from the needle 62 at the edge of the drum 58, and the tab gripper 74 is also closed. In Figure 27, this period of relative inactivity exists during the travel of the unit and pad between the points O and A on the path of the drum, the latter rotating in a counter-clockwise direction.

As the loop-attaching unit 60 reaches the point A, the roller 298 strikes a variation from normal in its cam track to effect a shift of the bifurcated lever 292 to the position indicated by broken lines in Figure 16 and by full lines in Figure 18. This shifting of the bicfurcated lever 292, to a position indicated by the letter B on the drum moves the segment cam plate 302 upwardly (Figures 16 and 18) relative to the rollers 344 and 332, positioning the latter on their respective cam surfaces so as to help speed up the opening of the fingers 76. The rollers 344 are simultaneously positioned, by action of finger cam 434 and roller 324 controlling arm 330, so that they may move quickly to a high point on their cam surfaces 304 to move the fingers 342 away from the fingers 336, and the rollers 332 move quickly to a low point on their cam surfaces 306 to move the arms 330 farther apart, as the roller 324 continues its path around the cam 434.

While the fingers are expanding in the manner just described, they have also rotated with the drum 58 to a position within the lowermost loop 68 held by the loop-forming device 64 to receive this loop in the manner described above with respect to the loop-forming device. Consequently, at the instant of their full expansion the fingers 336 and 342 have grasped the loop, as shown in Figure 18.

As the expanded fingers 76 pick up the loop 68 from the lower end of the loop-forming device 64, the roller 324 controlling the arms 330, which support the expandable fingers, strikes a variation in its path on the cam surface 434. This change in direction of the roller 324 causes the arm 330 to pivot about the hinge pin 318 in the direction of the needle 62. At the same time the roller 298 moves in its cam groove 308 back toward its high spot (away from the outer sleeve in Figure 16), moving the segment cam plate 302 toward the needle 62. This generally simultaneous movement of the segment cam plate 302 and the finger arm 330 maintains a relationship between the rollers 332 and 344 and their respective cam surfaces 306 and 304 to keep the fingers 336 and 342 open.

Looking particularly at the diagram in Figure 27, it will be noted that shortly after the expanded fingers begin their movement toward the needle at point B, the roller 360 (Figure 16) at the inner end of the gripper arm 354 strikes a variation in its course around the cam plate 432 to effect a movement of the gripper arm toward the needle 62. The point at which this inward movement of the gripper arm begins is indicated by the letter C on the path of the drum in Figure 27.

As the fingers 76 move inwardly with the loop 68 affixed thereto, the loop encircles the extended tab portion 55 of the sanitary napkin. The tab portion of the wrapper being maintained in such position by the action of the air jets 72 previously described. In this respect, it might be noted that the inoperative position of the needle 62 places the point of the needle slightly above the extended tab portion 55 of the sanitary napkin. This position is maintained by the travel of the needle-operating roller 406 about the circular portion of its cam plate 436, shown from point O to a point D in Figure 27. At point D in the cycle of rotation of the drum 58, the upper portion of the loop 68 has engaged the eye of the needle 62 and the fingers 76 have moved the remainder of the loop a short distance past the needle (Fig. 27).

Furthermore, while the needle moves a very slight amount downwardly, as shown by the gradual levelling off of the cam surface engaged by the roller 406, the roller 376 operating the movable lower member 364 of the gripper 74 strikes the cam plate 448 to open the gripper fingers as they continue to move inwardly toward the drum 58 under the action of the gripper arm roller 360 and its cam plate 432. This position is shown generally in Figure 20.

As the gripper finger roller 376 passes off of the cam plate 448 the lower jaw 364 snaps shut against the stationary upper jaw 366, grasping the extended tab portion of the sanitary napkin as seen in Figures 21 and 22. Almost simultaneously with this action, the needle 62 moves downwardly through the tab 55, carrying with it the loop portion held in the eye of the needle. Point E on the drum in Figure 27 indicates the position in the cycle for the beginning of the stitching action of the needle.

Lagging slightly behind the beginning of the stroke of the needle through the tab end 55 of the sanitary napkin "P," the roller 298 strikes a variation in its path on the cam plate 308, causing the segment cams 304 and 306 to move rather rapidly in relation to their respective rollers 344 and 332. This causes the fingers 336 and 342 to collapse and thus release the tension on the loop 68 so that it might be drawn through the fabric of the tab portion of the sanitary napkin by the needle 62. The collapsing of the fingers begins approximately at the point on the cycle designated at F in Figure 27, and is shown in Figures 29 and 33.

As the fingers 336, 342 continue to collapse, the needle 62 continues its downward stitching motion, and, at approximately the point designated as G (Fig. 27) in the cycle of operation, the finger arm roller 324 strikes a variation in its path around the cam plate 434 to retract the finger arm 330 away from the drum 58 and withdraw the fingers 336, 342 from the loop (Fig. 35). The needle continues to the end of its stroke (Figs. 24 and 30), which occurs at point H in the cycle. At this point the loop 68 on the tab 55 is relatively tight and the lower end of the needle 62 extends between the flat spring, loop-tightening elements 370. Also, the gripper finger roller 376 has established contact with the second curved plate 446, which operates to open the gripper fingers 364 and 366.

As the gripper fingers open to release the tab end of the sanitary napkin, the gripper arm roller 360 strikes a change in its direction around the cam plate 432 and the gripper arm 354 begins to move away from the looped tab portion of the sanitary napkin. The needle roller 406 having reached the point J, indicating a variation in the path around the associated cam plate 436, the needle 62 begins moving upward. Also, with the retraction of the gripper arm 354 and the upward movement of the needle 62, the loop-tightening elements 78 move away from the needle. As the inwardly-curved, end portions of the loop-tightening elements (Fig. 23) contact the lower end of the loop 68 they pull it out of the eye of the needle. The needle rises rather rapidly at this point in the operation to pass back to its inoperative position above the tab end of the sanitary napkin. The loop-tightening elements 78 tighten the loop 68 on the tab 55 as they continue to move away from the drum and finally release the loop when the fabric has been stretched to its fullest extent.

At point K (Fig. 27) in the cycle of operation of the drum 58 we find, therefore, that the finger arms 330 and the gripper arm 354 are retracted away from the drum, the gripper finger roller 376 has passed off the plate 446 to permit the gripper fingers 74 to close, and the needle 62 has retracted to its inoperative position. In other words, the various parts of the loop-attaching mechanism 60 have resumed the positions generally shown in Figure 16 which they continue to hold until the unit 60 again reaches the point A of the drum cycle.

The looped pad continues its movement with the drum 58 until removed by the pick-up wheel 450 and carried to the packaging assembly station 82 for handling in a manner to be described.

The package assembly station described hereinafter is disclosed and claimed in the co-pending application, Serial No. 282,137, of Charles T. Banks, filed April 14, 1952, and assigned to the assignee of the present application.

*Packaging assembly station*

As just indicated, the looped santiary napkins are taken from the rotating drum 58 by a pick-up wheel 450 disposed at the rear (right side in the drawings) of the drum. It will be seen in Figures 1 and 4, that on the rear side of the drum 58 there is fixedly supported a curved strap 452 which extends in overlying relation to the wheel 450 for directing the loop pads on to the platform members 496 (Fig. 37). A series of projecting studs or pins 454 spaced around the periphery of the pick-up wheel 450 engage the santiary napkins as they move upwardly on the rear side of the drum 58 and carry them on to a horizontal platform portion of the strap 452.

Looking also at Figure 42, it will be seen that the pick-up wheel 450 comprises a pair of circular portions 451 which are secured together in spaced-apart relation by a hub 453. The strap 452 is curved at the end thereof overlying the pick-up wheel 450 and extends between the circular portions 451 in general alignment with their outer peripheries (Figures 1 and 37).

The pick-up wheel 450 includes a central supporting shaft 458 with opposite end portions thereof being journaled in suitable bearings 460 carried by the side frame members 150. The strap 452 is supported at its forward end by a cross bar 462 (Figure 37) extending between the side frame members 150, and at its rear end by a pair of vertical posts 464 which form the upper portion of the vertical bin 88 into which the sanitary napkins are to be placed.

Overlying the strap 452 is the conveyor 80 comprising a pair of endless chains 466 having spaced-apart fingers 468 projecting vertically therefrom in position for engaging each sanitary napkins, as it is brought onto the platform, to move the pad rearwardly on the machine. Specifically, a pair of spaced-apart cross shafts 470 and 472, suitably journaled, respectively, in bearings 474 (Fig. 41) carried by the side frame members 150 forward on the machine and in bearings 476 supported on the vertical frame members 106 which are disposed at an intermediate portion of the machine each have fixed thereto a pair of sprockets 478 and 480, respectively, for supporting and driving the laterally spaced pair of endless chains 466 (Figs. 37 and 41). Spaced along each of these chains and mounted thereon for relative swinging movement are the previously mentioned fingers 468 which form one leg of an L-shaped member fixed at its vertex to a transverse pin 482 (Figure 39) rotatably supported by a portion of the chain. The free end portion of the other leg 484 has a roller 486 rotatably mounted thereon.

A cam plate 488 is disposed along the inner side of each chain with its edges disposed for engagement by the rollers 486. As shown in Figs. 37 and 41, the cam plates 488 are supported from overlying portions of the machine frame, as by the cylindrical parts 490 which are welded or otherwise secured to a pair of cross pieces 492 rigidly uniting the cam plates.

At the rearward end of the strap 452, along which the looped pads are moved by action of the conveyor mechanism 80 just described, is the pad-receiving bin 88. This bin comprises a pair of spaced-apart vertical plate members 494 at the lower portion thereof which are suitably supported between the adjacent machine frame members 106. The upper portion of the bin 88 includes the four posts 464 (Fig. 41) which are spaced to permit passage of a sanitary napkin therebetween. In order to allow a predetermined number of the sanitary napkins to be taken from the bin 88, as by an endless conveyor mechanism 92, without interrupting the flow of the pads to the bin, there is provided the upper gate 84 and the lower gate 86, which control the fall of the pads in the bin. These gates also assist in keeping the pads in alignment during their movement toward the final packaging station (not shown).

The bin 88 is rectangularly shaped to conform generally with the size of a sanitary napkin. The upper gate 84 for the bin comprises a pair of platform members 496 covering opposite end portions of the bin and at the general level of the strap 452 forming the conveying platform for the pads. The platform members 496 are each fixed to the lower end of an arm 498 which is fixed at its upper end to a shaft 500 journaled at its opposite ends in bearings 502 carried by the vertical frame member 106 of the machine. A rocker arm 504 (Fig. 43) is also fixed at one end to this shaft and has at its free end a roller 506 mounted on a spindle 508 which is carried by the rocker arm.

A cam 510 is carried by each of the machine frame members 106 in position for engagement with the roller 506 on the adjacent rocker arm 504. Each of the cams 510 is fixed to a cross shaft 512 which extends between the machine frame members 106 (Figure 40) and is journaled in suitable bearings 514 carried by these members. A sprocket 516 is also fixed to each of the cross shafts 512 and connected in driven relation with a suitable source of power, as will be described later. Each of the rollers 506 is held against the peripheral surface of the associated cams 510 by a tension spring 518 (Figure 43) which extends between the outer end of the rocker arm 504 and a lug 520 extending from a lower portion of the supporting frame structure.

Spaced below the upper gate 84 is the lower gate 86 comprising a pair of relatively movable platform members 522. These platform members extend longitudinally of the bin 88 and move at right angles to the direction of movement of the upper gate sections. Each of the platform members 522 is fixed to the lower end of a pair of arms 524 fixed at their upper ends to a shaft 526 journaled at opposite ends thereof in sections of the machine frame members 106.

At one end of the two shafts 526 which support the lower platform members 522 there is fixed a second pair of depending arms 528, each having a roller 530 at its lower end. Interposed between these arms for engagement with the rollers 530 is a circular cam 532. The cam 532 is fixedly supported on a shaft 534 journaled in the adjacent section of frame member 106 and extending therethrough for connection with a gear reduction and 536 (Fig. 41).

The lower end of the receiving bin 88 has a platform portion extending longitudinally thereof, which comprises a section of the stationary ribbon-like member 90 overlying the central portion of the endless conveyor mechanism 92. The conveyor mechanism 92 includes a pair of spaced-apart endless chains 538 or the like which are supported and driven by a pair of sprockets 540 and 542, respectively, disposed at each end of the conveyor (Fig. 44). A pair of parallel elongated plate members 544 are bolted or otherwise secured at one end to the machine frame members 106 and project outwardly therefrom to form an extension for the conveyor. The outer pair of sprockets 542 for the endless chains 538 are carried by coaxially aligned stub shafts 546 journaled in the outer ends of the extension plates 544. The inner pair of sprockets 540 are fixed to a shaft 547 which has its end portions journaled in adjustable bearing structures 549 carried by the frame members 106.

As seen particularly in Figures 44 and 45, the extension portion of the conveyor mechanism is inclined upwardly from the lower platform of the pad-receiving bin 88. To effect a corresponding change in the direction of the endless chains 538 there is provided a pair of sprockets 548 for engaging the upper flight of each of the chains. Each of the sprockets are rotatably mounted on a stub shaft 550 carried by the vertical side frame members 106 of the machine. A second pair of sprockets 552, engaging the upper surface of the lower flight of the endless chains 538, are fixed to a cross shaft 554 journaled at end portions thereof in the spaced plate members 544 forming the extension for the conveyor 92.

For moving the sanitary napkins out of the lower end of the bin 88 and through the chute or trough formed by the conveyor extension plate members 544, there is mounted on the endles chains 538, for movement therewith, a series of vertically extending pusher rods 556. These pusher rods are disposed on opposite sides of the ribbon-like member 90, disposed along the center line of the conveyor, and each are fixed to a transverse rod 558 supported between the endless chains 538. An arm extension 560 is fixed to each of the transverse rods 558, at right angles thereto, and carries a spindle mounted roller 562. The roller 562 is disposed for engagement with the outer edge of a vertically arranged plate structure 564 suitably supported on the conveyor, as by means of the cross member 566.

Because of the change in direction of the conveyor chains 538, the plate structure 564 is preferably made in two sections. A short plate section 568 underlying the bin portion 88 of the packer station 82 is supported at opposite ends thereof by the cross-shaft 547 and by the cross member 566 suitably secured between the machine side frame members. The portion of the plate structure in the trough section of the conveyor comprises an elongated plate 570, which is supported at one end by the cross member 566 and at the other end by the cross-shaft 546 at the outer end of the trough. It will be seen, therefore, that the engagement of the roller 562 with the outer edge portions of the plate structure 564 maintains the pusher rods 566 in a vertical position during their movement along the upper path of the conveyor 92.

Operation of mechanism at the packaging assembly station

Having in mind the structure just described and considering that suitable drive means is provided for all of the operating parts, description will be given of the operation of this mechanism. The drive mechanism will be described later with respect to the entire loop-attaching machine.

As indicated previously, the looped pads are taken from the rotating drum 58 by the action of the pins 454 on the pick-up wheel 450 and transferred to the stationary platform 452 disposed to the rear of the drum (Figs. 1 and 37). At this point, a pair of the fingers 468, carried by the conveyor mechanism 80 disposed above the platform, engage the pad and push it along the platform 456 to a position overlying the upper gate 84 with the forward edge of the pad abutting the gear guide strips 464 of the vertical bin 88. The guide roller 486 for the finger 468 having reached the cut-out portion of the cam plate 488, the fingers are permitted to tilt away from the engaged edge of the pad to clear the pad and the bin structure. Having passed the bin structure, the finger-roller 486 again engages the edge of the plate 488 to return the finger 468 to its operating position, that is, projecting outwardly from the chain 466 in fixed relation thereto.

Almost simultaneously with the placement of the sanitary napkin on the upper gate 84, the two sections 496 thereof swing outwardly to permit the napkin to fall on to the lower gate 86, and then immediately swing back in closed position for receiving another pad. A predetermined number of sanitary napkins, preferably three or four with the disclosed apparatus, are placed in this manner on the platform formed by the lower gate structure 86 prior to the opening of the lower gate. Having accumulated this predetermined number of sanitary pads the two sections 522 of the lower gate swing away from each other, under the action of the cam 532 operating against the arms 528, and release the pads to fall to the lower end of the bin 88 on to the ribbon-like, stationary center member 90 of the conveyor mechanism 92. The lower gates swing back into their platform-forming position immediately after releasing the sanitary napkins.

The movement of the pusher rods 556 on the conveyor mechanism 92 is timed so that each pair of these rods pass into the bin 88 in time to remove a predetermined number of sanitary napkins therefrom (a dozen in the illustrated structure) in between the opening of the lower gate structure 86. The stack of sanitary napkins are carried by the pusher rods 556 out to the end of the trough 544 where they are taken by suitable apparatus and placed in a box or package in readiness for sale to the consumer.

Thus it is seen that each of the looped pads momentarily comes to rest at three different stages in the stacking of the pads preparatory to packaging. These pauses occur at the upper gate 84, the lower gate 86, and at the platform 90 in the bottom of the bin. As previously indicated, the primary purpose of this arrangement is to provide for a continuous flow of looped pads from the loop-attaching mechanism. By thus interrupting the fall of the pads into the bin 88, the conveyor mechanism 92 at the lower end thereof can carry away a predetermined number of the sanitary pads without interference from the incoming pads in the upper portion of the bin. The timing of the action of the gates 84 and 86 and the pusher rods 556 on the conveyor is synchronized with the speed of the pads being taken from the rotating drum 58 to make it possible to prepare the pads for packaging, in a relatively small amount of space and in close relation to the drum, as they come from the drum.

Of lesser importance with respect to the operation of the loop-attaching machine but of some importance in the packaging of the sanitary napkins, is the fact that the particular arrangement of the gates in the bin provide means for assuring a uniform positioning of the sanitary napkins in the stack to be packaged.

Modified packer station

Referring now to Figures 46–50, it is seen that a modified arrangement is provided with respect to the packer station just described. In the modified form the bin structure 88 and the conveyor mechanism 92 at the bottom end thereof is essentially identical with that just described, and the only real change is in the apparatus used in transferring the looped pads from the rotating drum 58 to the upper gate 84 of the bin 88.

Adjacent the rear end of the rotating drum 58, in position to receive the looped pads as they move away from the drum under the guidance of the curved strip 452 mentioned above, is an endless conveyor mechanism 572 moving to the rear of the machine structure. This conveyor mechanism comprises a pair of spaced-apart endless chains 574 which are driven and supported by a series of sprockets 576, 578, 580 and 582, carried by cross-shafts 584, 586, 588 and 590, respectively, suitably journaled in adjacent frame members of the machine (not shown). The upper flight of the chains 574 is disposed along a horizontal plane in continuous relation with a platform 592 disposed between the end of the conveyor and the upper gate structure 84 of the packer station.

The endless chains 574 have fixed thereto in uniformly spaced relation a series of outwardly projecting fingers 594 which serve to propel the pads from the drum 58 on to the platform 592. At the conveyor end of the platform there is mounted a relatively narrow bar member 596 which is disposed generally along an extension of the center line of the conveyor. The upper surface of the bar 596 lies above the top surface of the conveyor and, consequently, the opposite ends of the bar are tapered downwardly to present a smooth surface for movement of the center portion of the pads onto and off of the bar.

For moving the pads from the conveyor onto the platform 592, there is provided an endless belt 598 which is disposed above the bar member 596 and is supported and driven by a pair of pulleys 600 and 602 disposed at opposite ends of the belt. The pulley 600 is fixed to a cross-shaft 604 which is suitably journaled in adjacent portions of the machine frame structure. The pulley 602 is rotatably mounted on a cross-shaft 606 also journaled on the frame. The lower flight of the belt 598 is positioned in close relation to the bar 596 in order that the center portion of the pads may be pressed therebetween and moved rearwardly along the platform 592 under the moving pressure of the belt.

At the rearward end of the belt 598 there is mounted an additional pair of spaced-apart belts 608 and 610 disposed for engagement with outer end portions of the sanitary napkins as they are conveyed rearwardly by the first-mentioned belt 598. A pair of pulleys 612, fixed to the cross-shaft 606 supporting the rear drive pulley for the forward belt 598, support the forward portion of the belts 608 and 610 and provide the drive means therefor. The intermediate and rear portions of the belts 610 and 612 are supported by additional pairs of pulleys 614 and 616, respectively, which are mounted on cross-shafts 618 and 620 suitably mounted in adjacent portions of the machine frame (not shown).

Intermediate the pairs of belts 608 and 610 and extending rearwardly therefrom to the rear side of the bin structure, is a pair of endless chains 622 having finger elements 624 thereon for moving the pads onto the upper gate 84 of the bin 88. The endless chains 622 are spaced apart and suitably mounted on sprockets 626 and 628, carried by cross shafts 630 and 632, respectively, which are suitably journaled in a portion of the frame structure (not shown).

Adjacent the rear portion of the forward belt 598 and disposed on opposite sides thereof are a pair of nozzles 634 which are arranged to direct a stream of air toward the tab ends of the sanitary napkins as they move off of the center bar member 596 and under the rearwardly disposed pair of belts 608 and 610. Any suitable mounting means for the nozzles and source of air pressure might be used. A detailed showing of this apparatus is believed unnecessary for a complete understanding of the present invention.

Operation of modified packing assembly station

Referring to Figure 46, it will be seen that each sanitary napkin is taken from the rotary drum 58 at the forward end of the machine structure and moved rearwardly by the endless conveyor mechanism 572. From the conveyor 572 the napkin or pad moves, under the rearwardly moving compressive force of the belt 598, onto the platform structure 592 with the center portions of the pad being raised somewhat by virtue of the center bar member 596.

As the pad passes the air nozzles 634, the tab end portions bearing the loop are raised relative to the platform 592 and folded back under the main part of the pad (Fig. 49) by the air pressure. The pads then pass under the pair of belts 608 and 610 which move the pads rearwardly on the machine and, at the same time, firmly press the folded portions of the sanitary napkins in position (Fig. 50). When the pad is approximately under the large center wheels 614 of the belts, the fingers 624 on the endless chains 622 contact the rear edge of the pad and convey it onto the upper gate 84 of the bin structure 88. The action in the bin structure is identical with that previously described and, therefore, will not be repeated.

It is seen from the foregoing, that the modified form of structure, for handling the looped pad in preparation for packaging, has its main advantage in its achievement of the folding of the looped end portion which, of course, facilitates packaging the napkins.

*Drive mechanism for the machine*

With the foregoing description of the structure and operation of the machine for the securing of attachment loops to sanitary napkins, it is believed that a clear understanding of the drive means for the machine can now be had through the following description.

Although any suitable source of power may be utilized in driving the machine, the sole driving means for the structure shown in Figure 1 is an electric motor 636 having a drive shaft 638 with a pulley 640 mounted thereon. The drive shaft 638 is connected in driven relation to a pulley 642 (Fig. 3) fixed to the outer end of an overlying rotatable shaft 644 by means of a belt 646. The shaft 644 also carries a worm gear 648 in position for engagement with a gear 650 on the end of the main shaft 112. The shaft 644 carrying the worm 648 and the pulley 642 is suitably journaled at its opposite end portions in a pair of brackets 652 (Fig. 2) carried by the side frame member 108 of the machine.

The rotation of the main shaft 112, of course, carries with it the large drum 58 bearing the loop attaching units 60. It will also be remembered that the rotation of the drum 58 relative to the cam plates 310, 432, 434, 436, 442, and 444, which are supported by the main shaft, as well as the cam plates 446 and 448 which are disposed on the base 94 adjacent the drum, provides the entire motivating means for all of the relatively movable parts of the loop handling and stitching units.

Overlying the main shaft 112 is a drive shaft 654 for the loop forming mechanism 64 which is preferably made in two sections with the inner end portions journaled in a bearing box 656 carried by the cross brace 116 for the underlying frame structure. The outer end portions of the shafts 654 extend through the side frame members 114 and are journaled in suitable bearing structures 658 carried by the frame. At each of the outer ends of the shafts 654 is fixed a sprocket 660 (Fig. 3) which is aligned with a sprocket 662 on the outer end of the main shaft 112 and connected in driven relation therewith by a chain 664. Intermediate portions of the two shaft sections 654 are further supported in a pair of bearing structures 664 supported by the cross brace members 116 of the machine frame structure. Since the drive means for each of the loop forming devices is the same, a description of the drive for only one of the devices will be given.

Looking at Figures 2, 10 and 4, it is seen that the drive shaft 654 for the loop forming mechanism has fixed thereto a bevel gear 666 for driving a meshing bevel gear 668 at the adjacent end of the shaft 194 which is rotatably mounted at spaced points therealong in the pair of vertical plates 198. These plates are supported on the cross members 116 of the frame structure, and in turn the plates 198 each have fixed thereto in edge-abutting relation a narrower plate 670 to form a support for the upper mandrel 170.

The shaft 194 to which the bevel gear 668 is fixed also carries the anvil roll 190 of the severing mechanism 174. The outer end of the shaft 194 carries a gear 672 which meshes with a gear 674 on the countershaft 196 mounting the cutter roll 204. Adjacent the bevel gear 668 on the shaft 194 there is a sprocket 676 (Figure 10) having a chain 678 connecting it with a sprocket 680 fixed to the overlying shaft 187 which helps to support the upper mandrel 170. A gear 682 fixed on the driven mandrel supporting shaft 186 engages a gear 684 on the other mandrel supporting shaft in order that the two may rotate in unison. The two mandrel supporting shafts are suitably journaled at opposite end portions thereof in bearings mounted on the vertical plate members.

The outer end of the mandrel supporting shaft 186 has a sprocket 686 fixed thereto, and a chain 688 connects this sprocket with another sprocket 690 mounted below on the outer end of the cross shaft 214. This cross shaft extends through the plate members 116 and 198 and has fixed to its inner end the upper sprocket 212 for driving the chain 208 bearing the fingers 210 for moving the loop along the lower mandrel 172. Also, carried by the cross shaft 214 is a sprocket 692 connected by a chain 694 to a sprocket 696 on the cam shaft 230 below. As will be noted in Figure 10, this cam shaft 230 has the cam 242 on the outer end thereof for operating the loop receiving fingers 234 and, also, the cam 228 on the inner end of the shaft for operating the hold-down lever 218 which assists in separating the several sections of loop fabric from the strip.

Referring back to the main drive shaft 654 for the loop forming mechanism 64, as seen best in Figures 2, 11, and 4, it will be seen that adjacent the journal box 656 there is fixed to the shaft 654 a sprocket 698 for driving the endless chain 700 adjacent the upper mandrel. This sprocket is connected by the chain 700 with a sprocket 702 on the upper shaft 704 supporting the endless chain 178 for the fingers 176 which pull the loop fabric along the upper mandrel. The lower shaft 706 for this endless chain 178 carries a gear 708 at its outer end for transmitting motion to the endless chain 178 at the opposite side of the mandrel 170 through a gear 710 fixed to the lower shaft 706 thereof.

As will be seen clearly in Figure 1, the conveyor chain 134 from the magazine feed station 54 to the rotating drum 58 is driven by the rotation of the latter. Furthermore, it will be noted that the revolving cylinders 122 of the feed mechanisms are driven from the rear of the conveyor mechanism. A sprocket 712 is mounted on one end of the shaft 142 which supports the adjacent drive sprockets 140 for the conveyor chain 134. This sprocket is connected by a chain 714 with a sprocket 716 carried at the end portion of the shaft 124 supporting the rear cylinder. Another chain 718 and sprocket 720 connection is provided between the rear cylinder and the front cylinder and the front cylinder to drive the latter.

Looking also at Figures 2 and 40, it is seen that the mechanism employed in moving the sanitary napkins away from the rotating drum 58 and preparing them for packaging is driven from the shaft 148 which mounts the pair of drive sprockets 146 for the main conveyor 56 just described. A sprocket 722 fixed at one end of the shaft 148 is connected by a chain 724 with a sprocket 726 on the supporting shaft 458 for the pick-up wheel 450. The chain 724 also extends around a sprocket 727 on the adjacent end of the shaft 470 which supports the forward drive sprockets 478 (Figure 37) for the conveyor mechanism 80 to provide for movement of this conveyor.

The opposite end of the shaft 148 has fixed thereto another sprocket 728 which is connected by a chain drive 730 with a miter gear unit 732 (Figure 2) from which the power may be delivered through another chain 734 to the gear reducer unit 536. The gear reducer unit 536 has a pair of shafts 534 and 736 projecting outwardly therefrom, generally at right angles to each other. One of these shafts 534 extends in the direction of the packer station 82 and has mounted thereon the cam 532 which operates the lower gates 86 (Figure 40).

The other shaft 736 of the gear reducer unit has a sprocket 738 fixed thereto at one end which is connected by a chain 740 with the sprocket 516 on the shaft 512 mounting the cams 510 for operating the adjacent upper gate section 496 (Figure 43). The cam shaft 512 has also fixed thereto two additional sprockets 742 and 744, and the sprocket 742 is connected by a chain 746 with a sprocket 748 on the cam shaft at the opposite side of the bin 82 which operates the other upper gate section 496 (Figs. 43 and 44). The intermediate sprockets 750 and 752 (Fig. 44) are used to effect movement of the sprockets 742 and 748 in opposite directions. The other sprocket 744 on the cam shaft 512 is connected by a chain 754 with the drive sprockets for the conveyor mechanism 92 which is disposed at the lower end of the vertical stacking bin 82.

More specifically, the chain 754 extends around a sprocket 756 adjacent the lower end of the bin 82, to a sprocket 758 fixed to a shaft 760 journaled in the lower portion of a pair of the frame members 106, and then around an idler sprocket 762 mounted on a stub shaft 764 journaled in the adjacent side frame member 106 and back up to the sprocket 744 on the cam shaft 512 (Fig. 43). The drive for the outer end of the conveyor mechanism 92 is provided by a chain and sprocket connection comprising a pair of sprockets 766 (Fig. 45) fixed to the shaft 760, a pair of sprockets 768 fixed to the shafts 546 at the outer end of the conveyor, and a pair of endless chains 770 extending from the sprockets 766 to the sprockets 768. A pair of idler sprockets 772 are used on the underside of the chains 770, adjacent the sprockets 542, to prevent interference of the chain's motion by the bottom of the trough structure.

*Drive means for modified packaging assembly station*

The modified form of the invention, shown in Figure 46, is powered generally in the same manner described above with respect to the machine in Figure 1. However, there are necessarily some changes involved in providing a drive means for the additional conveyor belts.

The conveyor mechanism 572 for taking the looped sanitary napkins from the large drum 58 is driven through a connection with the drum operated conveyor 56 above. A chain 774 connects the sprocket 728 on the upper conveyor with a sprocket 776 fixed to the shaft 584 at the forward end of the lower conveyor 572.

The forward belt 598 disposed along the center of the platform 592 is driven, through a chain 599, by a sprocket 601 fixed to the shaft disposed at the rear of the upper conveyor mechanism. The rearwardly disposed pair of belts 608 and 610, as well as the conveyor chain 622 for delivering the pads to the vertical stacking bin 88, are driven from the gear box 732 which receives its power from the rear shaft 590 of the lower conveyor mechanism 572 through a chain 776 and sprocket 582 connection.

A chain 778 from a sprocket on the gear box 732 to a sprocket fixed to the shaft 630 at the forward end of the endless chain conveyor 622 provides the drive means for the latter. Also, a chain 780 from another sprocket on this shaft 630 to a sprocket on the shaft 606 supporting the adjoining ends of the three conveyor belts provides the drive means for the belts 608 and 610. The vertical stacking bin mechanism is operated from the gear box 732 in the manner described above with respect to the structure in Figure 1.

We claim:

1. An improved method in the manufacture of sanitary napkins having attachment loops fixed to opposite end portions thereof, comprising the steps of continuously feeding uniformly-spaced, unlooped sanitary napkins through a given path, extending the tab end portions of each of said sanitary napkins outwardly in generally coplanar relation with the center portion of the sanitary napkin by means of air pressure during movement through an intermediate portion of said path, placing a loop of knitted fabric in encircling relation to each of said tab end portions during movement of said sanitary napkin through a first section of said portion of said path, firmly supporting said tab end portions during movement of said sanitary napkin through a second section of said portion of said path of movement, and, while said tab end portions are thus supported, forcing a section of said loop through said tab end portions to secure said loop in fixed relation thereto.

2. Apparatus for forming loops from a length of expandable fabric tubing comprising, a first mandrel having one end portion tapered to receive the fabric tubing in covering relation thereto, means for moving said tubing along said first mandrel, the other end of said first mandrel being shaped to permit collapsing of the tubing to form a relatively wide, flattened two-ply section of material as it leaves said mandrel, a second mandrel spaced from said first mandrel in extending relation to said other end of said first mandrel, a connecting means between said other end of said first mandrel and the adjacent end of said second mandrel providing a guide for said fabric tubing as it passes from said first mandrel on to said second mandrel in covering relation to the latter, a severing mechanism arranged and disposed to cut through said two-ply section of material at spaced intervals across its width as it passes over said connecting means, whereby at least one section of the fabric tubing will be left uncut, said second mandrel being shaped non-uniformly in cross section along its length, and additional means for moving the fabric tubing along said second mandrel at a rate of speed greater than said movement along said first mandrel, whereby the partially severed fabric section will be broken away from said length of tubing and rolled upon itself to form a cord-like loop.

3. Apparatus for forming loops from a length of tubing of expandable material which is partially severed transversely in such a manner as to leave a bond connecting the sections of the material on opposite sides of the lines of severance comprising, a mandrel having a tapered portion adapted to receive and distend the partially severed sections of said tubing, means for engaging the end one of said partially severed sections on said mandrel so as to advance the same along said mandrel, additional means for briefly holding the section of said tubing immediately following said end section whereby movement of the latter along said mandrel is effective to break the bond therebetween, said mandrel being non-uniformly shaped in cross section along its length so that movement of the free section of expandable material therealong effects a distortion of said section causing same to roll upon itself into cord-like form, and frictional means yieldingly engaging a portion of said mandrel in position to slow the movement of one section of said cord-like loop relative to the remainder of said loop as it is moved along said mandrel by said engaging means.

4. Apparatus for forming a loop from a section of tubing of expandable material comprising, an elongated mandrel having a tapered portion adapted to receive and distend said tubing section, means for moving said section along said mandrel, said mandrel being nonuniformly shaped in cross section along its length so that movement of said section of expandable material therealong effects a distortion of said section causing same to roll upon itself into cord-like form and to angularly shift its axis, and a part yieldingly engaging a portion of said mandrel in the path of movement of said tubing section and coacting with said mandrel and said means to further shift the axis of said section.

5. Apparatus for forming loops from a length of knitted fabric tubing comprising a first elongated mandrel extending in a generally vertical direction and having its upper end portion tapered to receive the knitted fabric tubing in covering relation thereto, said first mandrel being generally flattened through its length in order to stretch said tubing width-wise and having its lower end portion tapered to permit collapsing of the tubing to form a relatively wide, flattened two-ply section of material as it leaves the mandrel, a pair of parallel, rotatable shafts disposed on opposite sides of said mandrel, said flattened portion of said first mandrel including a pair of oppositely facing, semi-cyclindrical recesses therein and said supporting shafts having a section therealong partially disposed within said recesses to provide a support for said mandrel and also to provide means for moving the tubing downwardly on the mandrel upon rotation of said shafts, a second elongated mandrel spaced from said first mandrel and extending downwardly therefrom in generally coaxial relation thereto, a wire extending between said first and second mandrels providing the sole support for the latter and providing a guide for the fabric tubing as it passes downwardly on to the second mandrel in covering relation thereto, a severing mechanism disposed between said first and second mandrels and including a rotatable cutter roll having a series of knives thereon disposed transversely of said wire, and a rotatable anvil roll, said cutter roll and anvil roll being disposed on opposite sides of said wire with a groove formed in one of said rolls to receive the section of wire which extends between the rolls, whereby said wire will be free of contact by said knives and whereby at least one strand of the knitted fabric tubing will be left uncut, means for continuously moving the knitted fabric tubing downwardly along said first mandrel, between said anvil roll and said cutter roll, and downwardly along said second mandrel, and additional means coacting with said first mentioned means to free the partially severed end section of fabric from the tubing by breaking said uncut strand, said second mandrel being shaped non-uniformly in cross section along its length so that movement of said free end section of knitted fabric over said mandrel will cause said end section to roll upon itself and form a cord-like loop.

6. Apparatus for forming and securing flexible loops to a continuously moving article comprising, a rotating drum having a station along its peripheral surface for receiving said article for movement therewith, means operable to maintain one end portion of said article in outwardly extending relation to the drum throughout a portion of the path of rotation of said drum, a loop forming device including conveying means for continuously moving a tubing of flexible material through a given path which includes a severing mechanism for transversely cutting said material in such a manner as to leave a bond connecting the sections of the material on opposite sides of the lines of severance, a mandrel having a tapered portion adapted to receive and distend the partially severed sections of said tubing, said mandrel being non-uniformly shaped in cross section along its length so that movement of the partially severed section therealong breaks said bond and causes said section to roll upon itself to form a cord-like loop and also to angularly shift its axis, and including additional means coacting with said conveying means to move the formed loop to a loop pick-up station fixed with respect to said portion of said path of rotation of said drum, a loop-attaching unit disposed for movement with said drum and including a set of relatively expandable fingers movable to receive said formed loop from said pick-up station and to place said loop in encircling relation to said extended end portion of said article as the latter rotates with said drum, said loop-attaching unit also including means for supporting said extended end portion against movement relative to said drum, and a needle supported for movement with said drum and being operable to engage a portion of the end encircling loop to pass said portion of the loop through said end portion and thereby secure said loop in position on said article.

7. Apparatus for securing a flexible loop to a continuously moving article comprising, a rotating drum having a station along its peripheral surface for receiving said article for movement therewith, means associated with said drum for maintaining an end portion of said article in outwardly extending relation to the drum throughout a portion of the path of rotation of said drum, a loop-attaching unit disposed for movement with said drum and including relatively movable parts adapted to receive a flexible loop from a supply means and to position same in encircling relation to said extended end portion of said article while the latter rotates with said drum through said portion of its path of movement, said loop-attaching unit also including means for supporting said extended end portion against movement relative to said drum, and an element supported for movement in unison with said drum and operable to secure said encircling loop in position on said article.

8. Apparatus as set forth in claim 6, wherein said means for maintaining said end portion of the article in outwardly extending relation to the drum comprises a series of nozzles disposed adjacent to said drum and operable to direct air streams toward said end portion.

9. Apparatus for securing attachment loops to opposite end portions of a plurality of continuously moving, uniformly-spaced sanitary napkins comprising, a rotating drum having stations spaced uniformly along its peripheral surface for receiving said sanitary napkins for movement therewith, means for maintaining the tab end portions of said sanitary napkins in outwardly extending relation to the drum throughout a portion of its path of rotation, a pair of loop-attaching units disposed adjacent each of said stations for movement with said drum, each of said units including relatively movable parts adapted to receive a flexible loop from a supply means and position said loop on the adjacent one of said extended end portions, and additional means for securing the loops thus positioned at opposite ends of the napkin in fixed relation thereto.

10. Apparatus for securing attachment loops to opposite end portions of a plurality of continuously moving, uniformly-spaced sanitary napkins comprising, a conveyor having stations spaced uniformly along one surface thereof and each receiving one of said sanitary napkins for movement therewith, means for maintaining the tab end portions of said sanitary napkins in outwardly extending relation to said surface throughout a first portion of the path of movement of said conveyor, a plurality of loop-attaching units disposed in pairs adjacent opposite sides of each of said stations for movement in unison with said conveyor, each of said units including relatively movable parts adapted to receive a flexible loop from a supply means and position said loop in encircling relation to the adjacent end portion of the associated napkin while the latter is moving through said first portion of said path, additional means carried by each of said units for maintaining said loop-encircled end portion in fixed position relative to said conveyor throughout a second portion of said path of movement, and including a needle operable to engage a portion of said loop and to pass said loop portion through said end portion of said sanitary napkin.

11. In an apparatus for attaching a flexible loop to an article wherein the apparatus includes a conveyor for moving the article through a predetermined path, a loop-handling unit comprising a base support disposed for movement in unison with said conveyor, a first arm pivoted on said base support and including a part adapted to receive a flexible loop, a second arm pivoted on said base support and including a gripper element adapted to engage a free end portion of said article to support same in fixed relation to said conveyor, means for controllably swinging said first arm relative to said base support during a portion of said predetermined path so that said part may receive a flexible loop thereon and then move same to a position encircling said free end portion of said article, and additional means for controllably swinging said second arm relative to said base support, in following relation to said first arm, whereby said gripper element may engage said end portion after the flexible loop is in position thereon.

12. In an apparatus for attaching a flexible loop to an article wherein the apparatus includes a conveyor for moving the article through a predetermined path and also includes means for supplying a loop to a pick-up station along said path, a loop-attaching unit comprising a base support disposed for movement in unison with said conveyor, a first arm pivoted at an intermediate portion thereof on said base support and including at one end a set of relatively movable fingers for receiving a flexible loop from said pick-up station, a follower element positioned on the other end of said first arm, a first stationary cam means disposed in position for engagement with said follower element throughout a portion of said predetermined path to move said fingers into engagement with said loop at said pick-up station and then move said loop into encircling relation to an end portion of an article on said conveyor, a second arm pivoted at an intermediate portion thereof on said base support and including a gripper element at one end for engaging said free end portion of said article to support same in fixed relation to said conveyor, a follower element on the other end of said second arm, a second stationary cam means disposed in position for engagement with said follower element on said second arm throughout a portion of said predetermined path to move said gripper element into engagement with said free end portion after the loop has been placed thereon, and means movable in unison with said conveyor and operable to secure said loop to said free end portion of said article.

13. Apparatus for successively securing attachment loops to opposite end portions of a plurality of continuously moving, uniformly-spaced sanitary napkins, comprising a rotating drum having stations spaced uniformly along its peripheral surface for receiving said sanitary napkins for movement therewith, means adjacent said drum for maintaining the tab end portions of said sanitary napkins in outwardly extending relation to the middle portion thereof throughout a portion of the path of rotation of said drum, means adjacent opposite side portions of said drum for forming attachment loops and supplying same to a loop pick-up station, a plurality of loop-attaching units fixed to said drum and arranged in pairs disposed adjacent to each of said stations, each of said loop-attaching units including an arm pivoted for movement relative to said drum and supporting at one end thereof a set of relatively expandable fingers for receiving an attachment loop from said pick-up station, means for moving said arm between said loop pick-up station and said drum whereby said expandable fingers can position an attachment loop in encircling relation to the adjacent tab end portion of said sanitary napkin as the latter rotates with the drum, each of said loop attaching units also including a second arm pivoted for movement relative to said drum and having means thereon for gripping said extended tab portion of the sanitary napkin, means for moving said second arm relative to said drum and for operating the gripper means thereon, a needle supported on said drum in relatively movable relation thereto, said needle being operable to engage a portion of the loop held by said expandable fingers in encircling relation to said tab end portion and to pass said portion of the loop through said tab end to secure the loop thereto.

14. Apparatus for successively securing attachment loops to opposite end portions of a plurality of continuously moving, uniformly-spaced sanitary napkins, comprising a rotating drum having stations spaced uniformly along its peripheral surface for receiving said sanitary napkins for movement therewith, air-pressure means adjacent said drum for maintaining the tab end portions of said sanitary napkins in outwardly extending, coplanar relation to the middle portion thereof throughout a portion of the path of rotation of said drum, means adjacent opposite side portions of said drum for forming attachment loops and supplying same to a loop pick-up station, a plurality of loop attaching units fixed to said drum and arranged in pairs disposed adjacent to each of said stations, each of said loop-attaching units including an arm pivoted for movement relative to said drum and supporting at one end thereof a set of relatively expandable fingers for receiving an attachment loop from said pick-up stations, means for moving said arm between said loop pick-up station and said drum whereby said expandable fingers can position an attachment loop in encircling relation to the adjacent extended tab end portion of said sanitary napkin, each of said loop-attaching units also including a second arm pivoted for movement relative to said drum and supporting a pair of relatively movable gripper fingers for grasping said extended tab end portion of the sanitary napkin, means for moving said second arm relative to said drum and extended tab portion, additional means for effecting relative movement between said gripper fingers, a needle supported on said drum in relatively movable relation thereto, said needle including an eye portion which is positionable to engage a section of said loop held by said expandable fingers, and means for moving said needle relative to said drum whereby said section of said loop can be passed through said extended tab portion to secure the loop thereto.

15. An improved method in the manufacture of sanitary napkins having attachment loops fixed to opposite end portions thereof, comprising the steps of continuously moving unlooped sanitary napkins through a given path, directing air pressure toward a first section of said path to cause the tab end portions of each of said sanitary napkins to extend outwardly in generally coplanar relation with the center portion of the napkin during movement thereof through said first section of the path, successively moving flexible loops into encircling relation with the extended tab ends of each napkin as it passes through said first section of said path of movement, firmly supporting said loop encircled tab end portions during movement of said napkin through a second section of said path of movement, and passing a section of said loop through said supported tab end portions to secure said loop in fixed relation thereto.

16. An improved method in the manufacture of sanitary napkins having attachment loops fixed to opposite end portions thereof, comprising the steps of continuously moving uniformly-spaced, unlooped sanitary napkins through a given path including a portion extending in an arc about a horizontal axis, extending the tab end portions of each of said sanitary napkins outwardly in generally coplanar relation with the center portion of the sanitary napkin during movement through said arcuate portion of said path by means of air pressure directed toward said tab end portions, placing a loop of resilient material in encircling relation to each of said outwardly extending tab end portions during movement of said sanitary napkins through a first section of said arcuate portion of the path of movement, firmly supporting the loop encircled tab end portions during movement of said sanitary napkin through a second section of said arcuate portion of said path, and passing a section of said loop through said supported tab end portions to secure the loop in fixed relation thereto.

17. An improved method in the manufacture of an article having a knitted fabric loop fixed to an end portion thereof, comprising the steps of continuously moving said article through a given path, extending said end portion outwardly in generally coplanar relation to the center portion of said arcticle during movement of the latter through a first section of said given path, moving a length of knitted fabric tubing toward said first section of said given path of movement of said article, flattening said tubing and severing an end portion thereof transversely so as to leave a bond of one or more strands of fabric, simultaneously separating the partially severed end portion of said tubing and distending it non-uniformly to cause said portion to roll upon itself to form a loop and also to shift its axis into general alignment with said extending end portion of said article, moving said loop into encircling relation to said end portion of said article as the latter moves through said first section of said path, firmly supporting said loop encircled tab end portion during movement of said article through a second section of said given path of movement, and passing a section of said loop through said supported tab end portion to secure said loop in fixed relation thereto.

18. Improved apparatus for the manufacture of sanitary napkins having attachment loops fixed to opposite end portions thereof, comprising means for continuously conveying uniformly-spaced, unlooped sanitary napkins through a given path, air pressure means for extending the tab end portions of each of said sanitary napkins outwardly in generally coplanar relation with the center portion of the sanitary napkin during movement through an intermediate portion of said path, means for placing a loop of knitted fabric in encircling relation to each of said tab end portions during movement of said sanitary napkins through a first section of said portion of said path, means for firmly supporting the loop-encircled tab end portions of said sanitary napkin during movement thereof through a second section of said portion of said path of movement, and means for passing a section of said loop through said supported tab end portions to secure said loop in fixed relation thereto.

19. Apparatus for securing a flexible loop to a continuously moving article comprising an article supporting means movable through a predetermined path and including a station thereon for receiving said article for movement therewith, means associated with said article supporting means for maintaining an end portion of said article in outwardly extending relation to the central portion of said article throughout a portion of said predetermined path, a loop-attaching unit disposed for movement with said article supporting means and including relatively movable parts adapted to receive a flexible loop from a supply means and to position same in encircling relation to said extended end portion of said article while the latter moves with said article supporting means through said portion of its path of movement, said loop-attaching unit also including means for supporting said extended end portion against movement relative to said article supporting means, and an element supported for movement in unison with said article supporting means and operable to secure said encircling loop in position on said article.

References Cited in the file of this patent
UNITED STATES PATENTS

| | | |
|---|---|---|
| 1,473,955 | Eberly | Nov. 13, 1923 |
| 2,152,493 | Newman | Mar. 28, 1939 |
| 2,352,355 | Young | June 27, 1944 |
| 2,364,839 | Young | Dec. 12, 1944 |
| 2,510,638 | Klock | June 6, 1950 |
| 2,556,383 | Williams | June 12, 1951 |
| 2,601,617 | Klock | June 24, 1952 |